US011630487B2

(12) United States Patent
Choi et al.

(10) Patent No.: US 11,630,487 B2
(45) Date of Patent: *Apr. 18, 2023

(54) ELECTRONIC DEVICE WITH FLEXIBLE DISPLAY AND METHOD FOR OPERATING SAME

(71) Applicant: SAMSUNG ELECTRONICS CO., LTD., Suwon-si (KR)

(72) Inventors: Youngin Choi, Suwon-si (KR); Jungchul An, Suwon-si (KR); Sungho Lee, Suwon-si (KR); Hanchul Jung, Suwon-si (KR); Jungyeob Oh, Suwon-si (KR); Bonghak Choi, Suwon-si (KR); Donghyun Yeom, Suwon-si (KR); Minwoo Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,615

(22) Filed: Aug. 11, 2022

(65) Prior Publication Data

US 2022/0382331 A1 Dec. 1, 2022

Related U.S. Application Data

(63) Continuation of application No. 17/351,325, filed on Jun. 18, 2021, now Pat. No. 11,416,037, which is a (Continued)

(30) Foreign Application Priority Data

Mar. 6, 2018 (KR) ........................ 10-2018-0026481

(51) Int. Cl.
*G06F 1/16* (2006.01)
*G06F 3/0484* (2022.01)
(Continued)

(52) U.S. Cl.
CPC .......... *G06F 1/1652* (2013.01); *G06F 1/1615* (2013.01); *G06F 1/1626* (2013.01);
(Continued)

(58) Field of Classification Search
CPC .... G06F 1/1652; G06F 1/1615; G06F 1/1626; G06F 1/1641; G06F 1/1647;
(Continued)

(56) References Cited

U.S. PATENT DOCUMENTS 9,152,180 B2 10/2015 Kim
9,223,348 B2 12/2015 Cho
(Continued)

FOREIGN PATENT DOCUMENTS

CN 106484174 A * 3/2017 ........... G06F 1/1626
EP 3 098 802 11/2016
(Continued)

OTHER PUBLICATIONS

U.S. Appl. No. 17/351,325, filed Jun. 18, 2021; Choi et al.
(Continued)

*Primary Examiner* — Ricardo Osorio
(74) *Attorney, Agent, or Firm* — Nixon & Vanderhye P.C.

(57) ABSTRACT

According to an embodiment of the disclosure, an electronic device, comprising, a housing, a flexible display slidably coupled to the housing, and at least one processor configured to control the flexible display to display an execution screen of a first application on a first region of the flexible display which is exposed to an outside based on a first mode, detect a pull-out of the flexible display from the housing, and in response to detecting the pull-out of the flexible display, control the flexible display to display the execution screen of the first application on at least a portion of the first region, and control the flexible display to display an execution screen of a second application different from the first appli-
(Continued)

cation on at least another portion of the first region and a second region of the flexible display which is exposed to the outside by the pull-out.

20 Claims, 30 Drawing Sheets

Related U.S. Application Data continuation of application No. 16/294,104, filed on Mar. 6, 2019, now Pat. No. 11,042,192.

(51) Int. Cl.
*G06F 9/48* (2006.01)
*H04M 1/02* (2006.01)

(52) U.S. Cl.
CPC .......... *G06F 1/1641* (2013.01); *G06F 1/1647* (2013.01); *G06F 1/1677* (2013.01); *G06F 3/0484* (2013.01); *G06F 9/4843* (2013.01); *H04M 1/0268* (2013.01); *G06F 2203/04102* (2013.01); *G06F 2203/04803* (2013.01)

(58) Field of Classification Search
CPC .... G06F 1/1677; G06F 3/0484; G06F 9/4843; G06F 2203/04102; G06F 2203/04803; H04M 1/0268
See application file for complete search history.

(56) References Cited

U.S. PATENT DOCUMENTS

| | | |
|---|---|---|
| 9,262,059 B2 | 2/2016 | Kim |
| 9,727,295 B2 | 8/2017 | Holung |
| 9,743,537 B2 | 8/2017 | Kim |
| 9,983,618 B2 | 5/2018 | Chen |
| 10,432,764 B2 | 10/2019 | Yu |
| 10,609,192 B1 | 3/2020 | KumarAgrawal |
| 10,613,809 B2 | 4/2020 | Lee |
| 10,627,931 B2 | 4/2020 | Chung |
| 11,042,192 B2 | 6/2021 | Choi et al. |
| 11,416,037 B2 | 8/2022 | Choi et al. |
| 2008/0303782 A1 | 12/2008 | Grant |
| 2010/0167791 A1 | 7/2010 | Lim |
| 2013/0201208 A1 | 8/2013 | Cho |
| 2013/0234951 A1 | 9/2013 | Kim |
| 2013/0275910 A1 | 10/2013 | Kim et al. |
| 2014/0028596 A1 | 1/2014 | Seo et al. |
| 2014/0247229 A1 | 9/2014 | Cho |
| 2014/0378183 A1 | 12/2014 | Xiong |
| 2015/0268914 A1 | 9/2015 | Kim |
| 2015/0331593 A1 | 11/2015 | Lee et al. |
| 2015/0338888 A1 | 11/2015 | Kim et al. |
| 2016/0026219 A1 | 1/2016 | Kim et al. |
| 2016/0132074 A1 | 5/2016 | Kim et al. |
| 2016/0349971 A1 | 12/2016 | Chi et al. |
| 2016/0370877 A1 | 12/2016 | Seo et al. |
| 2017/0064847 A1 | 3/2017 | Liu |
| 2017/0286042 A1 | 10/2017 | Lee et al. |
| 2018/0049328 A1 | 2/2018 | Choi |
| 2018/0081713 A1 | 3/2018 | Park et al. |
| 2019/0018636 A1 | 1/2019 | Kong |
| 2020/0301476 A1 | 9/2020 | In |

FOREIGN PATENT DOCUMENTS

| | | |
|---|---|---|
| KR | 10-2011-0093541 | 8/2011 |
| KR | 10-2013-0076397 | 7/2013 |
| KR | 10-2014-0124303 | 10/2014 |
| KR | 10-2014-0146992 | 12/2014 |
| KR | 10-2016-0080467 | 7/2016 |
| KR | 10-2016-0139320 A | 12/2016 |
| WO | WO 2016-035907 A1 | 3/2016 |

OTHER PUBLICATIONS

U.S. Appl. No. 16/294,104, filed Mar. 6, 2019; Choi et al.
International Search Report dated Jun. 19, 2019 in counterpart International Patent Application No. PCT/KR2019/002620.
Extended Search Report dated Jul. 11, 2019 in counterpart European Patent Application No. 19160982.5.
Communication pursuant to Article 94(3) EPC dated Jul. 16, 2020 in counterpart European Patent Application No. 19160982.5.
Korean Decision of Grant dated Feb. 17, 2021 for KR Application No. 10-2018-0026481.

* cited by examiner

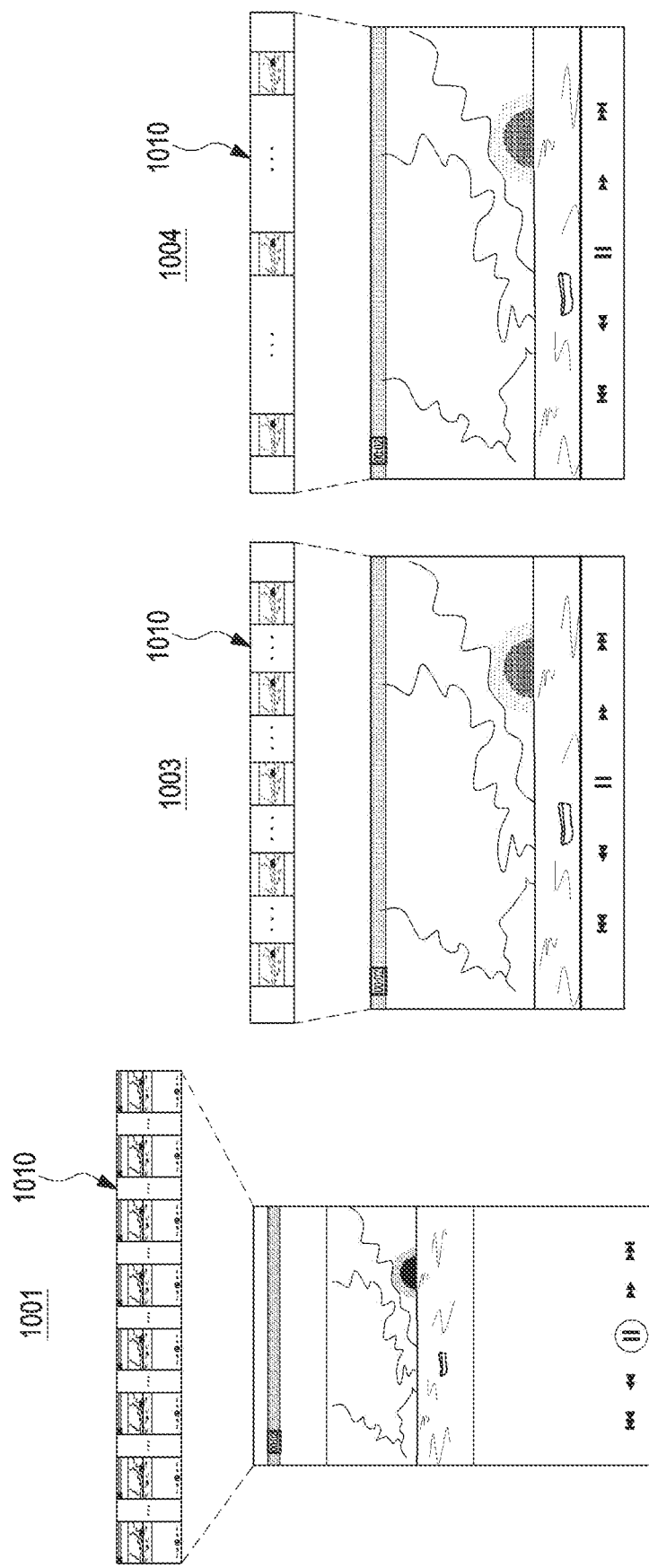

ELECTRONIC DEVICE WITH FLEXIBLE DISPLAY AND METHOD FOR OPERATING SAME

CROSS-REFERENCE TO RELATED APPLICATION

This application is a Continuation of U.S. application Ser. No. 17/351,325, filed Jun. 18, 2021 (U.S. Pat. No. 11,416,037), which is a Continuation of U.S. application Ser. No. 16/294,104, filed Mar. 6, 2019 (now U.S. Pat. No. 11,042,192), which claims priority to KR 10-2018-0026481, filed Mar. 6, 2018, the entire contents of which are all hereby incorporated herein by reference in their entireties.

BACKGROUND

Field

The disclosure relates to electronic devices with a flexible display.

Description of Related Art

Electronic devices may perform various functions corresponding to running applications.

Applications for mobile electronic devices have recently been soaring in popularity. Thus, there is an increasing demand for ways to display application execution screens for more convenient use of applications by mobile device users.

Nowadays, flexible display-equipped electronic devices are available. A flexible display may remain bent or curved in the electronic device while the electronic device is in its default mode, and the flexible display may be pulled out from the electronic device, expanding and hence providing an enlarged display region.

For example, when the electronic device runs a certain application, the execution screen of the application may be displayed on the whole display region of the display. To use another application, the user is required to first enter a command to close the running application. Upon receiving a close command, the electronic device may display a menu screen (e.g., a launcher application screen) with at least one icon which is configured to run applications, and upon detecting a designation of the icon corresponding to the other application, the electronic device may run the other application. These series of control operations on the electronic device may present an obstacle to quick and continuous use of the application.

The above information is presented as background information only to assist with an understanding of the disclosure. No determination has been made, and no assertion is made, as to whether any of the above might be applicable as prior art with regard to the disclosure.

SUMMARY

According example embodiments, an electronic device capable of controlling the execution screen of an application displayed on the display of the electronic device, and a method for operating the same, based on whether the display is pulled in or out may be provided.

According to an example embodiment, an electronic device comprises a flexible display and at least one processor configured to control the display to display an execution screen of a first application on a first region exposed to the outside based on a first mode with the display bent, detect a pull-out of the display, and to display, based on detection of the pull-out of the display, the execution screen of the first application on at least a portion of the first region of the display based on a second mode with the display pulled-out, and to display an execution screen of a second application different from the first application on another portion of the first region and a second region of the display exposed to the outside by the pull-out.

According to an example embodiment, a method for operating an electronic device including a flexible display comprises displaying an execution screen of a first application on a first region based on a first mode with the display bent, detecting a pull-out of the display, and displaying, based on detecting the pull-out of the display, the execution screen of the first application on at least a portion of the first region of the display based on a second mode, with the display pulled-out, and display an execution screen of a second application different from the first application on another portion of the first region and a second region of the display exposed by the pull-out.

Embodiments of the disclosure are not limited to the foregoing aspects and features, and other aspects and features will readily be appreciated by a skilled artisan from the following detailed description taken in conjunction with the accompanying drawings.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF TITLE DRAWINGS

The above and other aspects, features and advantages of certain embodiments of the present disclosure will become more apparent from the following detailed description, taken in conjunction with the accompanying drawings, in which:

FIGS. 10A, 10B, 10C, 11A and 11B are diagrams illustrating example application modes regarding resource allocations or display orientations according to an embodiment;

Throughout the drawings, like reference numerals will be understood to refer to like parts, components, and structures.

DETAILED DESCRIPTION

Figure 1:
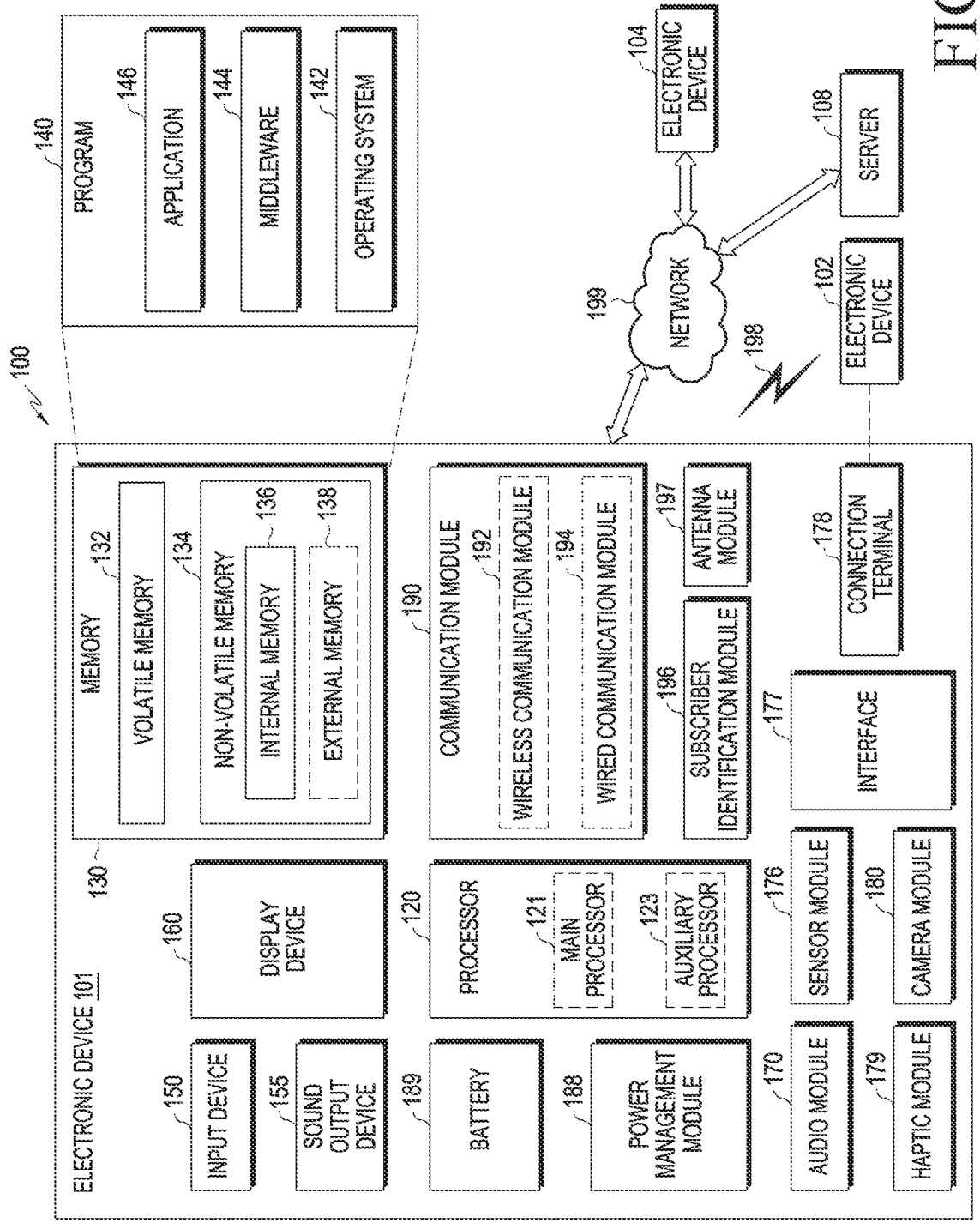
FIG. 1 is a block diagram illustrating an example electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network. 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD) card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 19 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According, to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
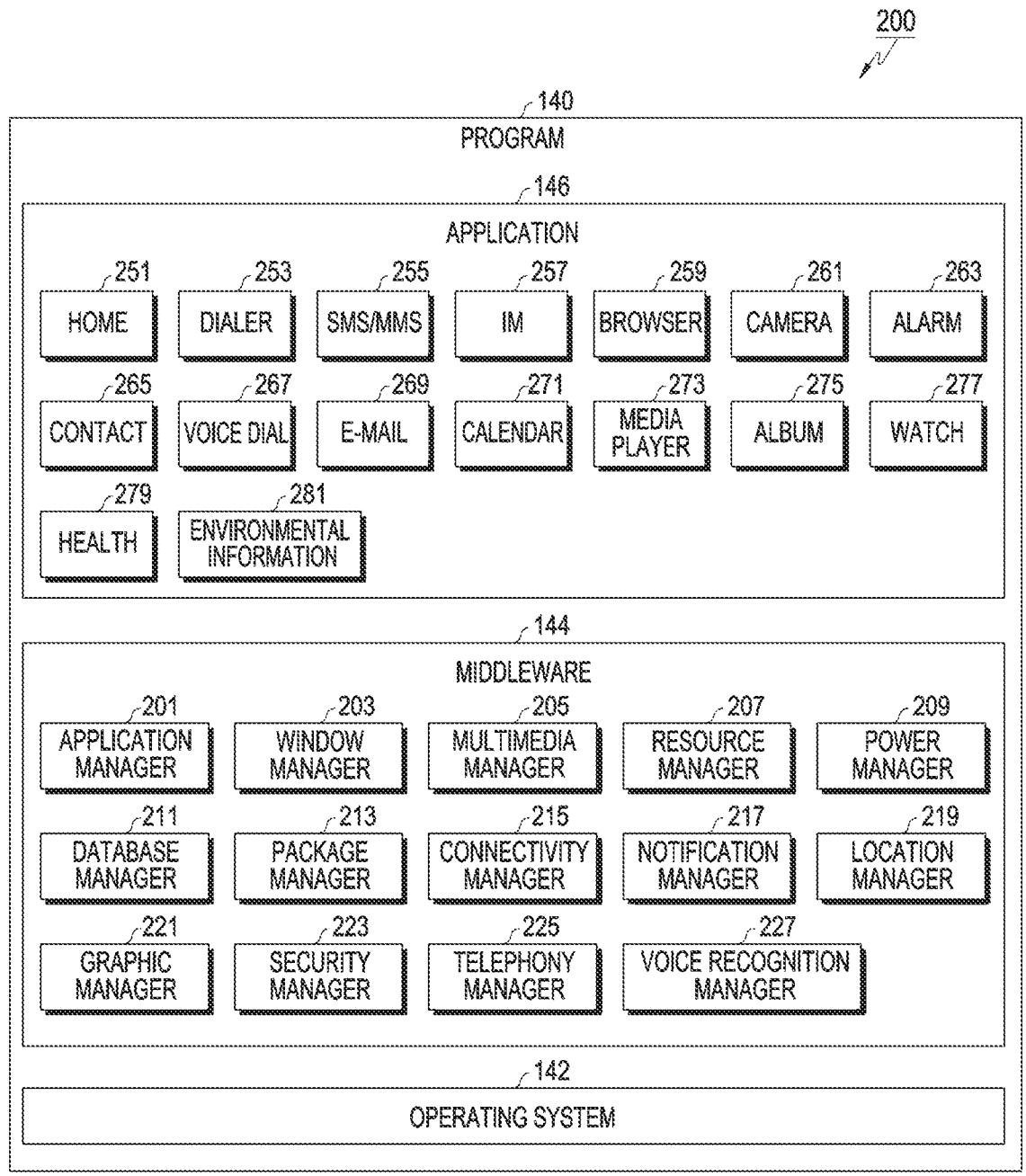
FIG. 2 is a block diagram illustrating a program according to an embodiment.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable on the OS 142. The OS 142 may include, e.g., Android™, iOS™, Windows™, Symbian™, Tizen™, or Bada™. At least part of the program 140 may be pre-loaded on the electronic device 101, e.g., upon manufacture, or may be downloaded or updated from an external electronic device (e.g., the electronic device 102 or 104 or the server 108) when used by the user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (LM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
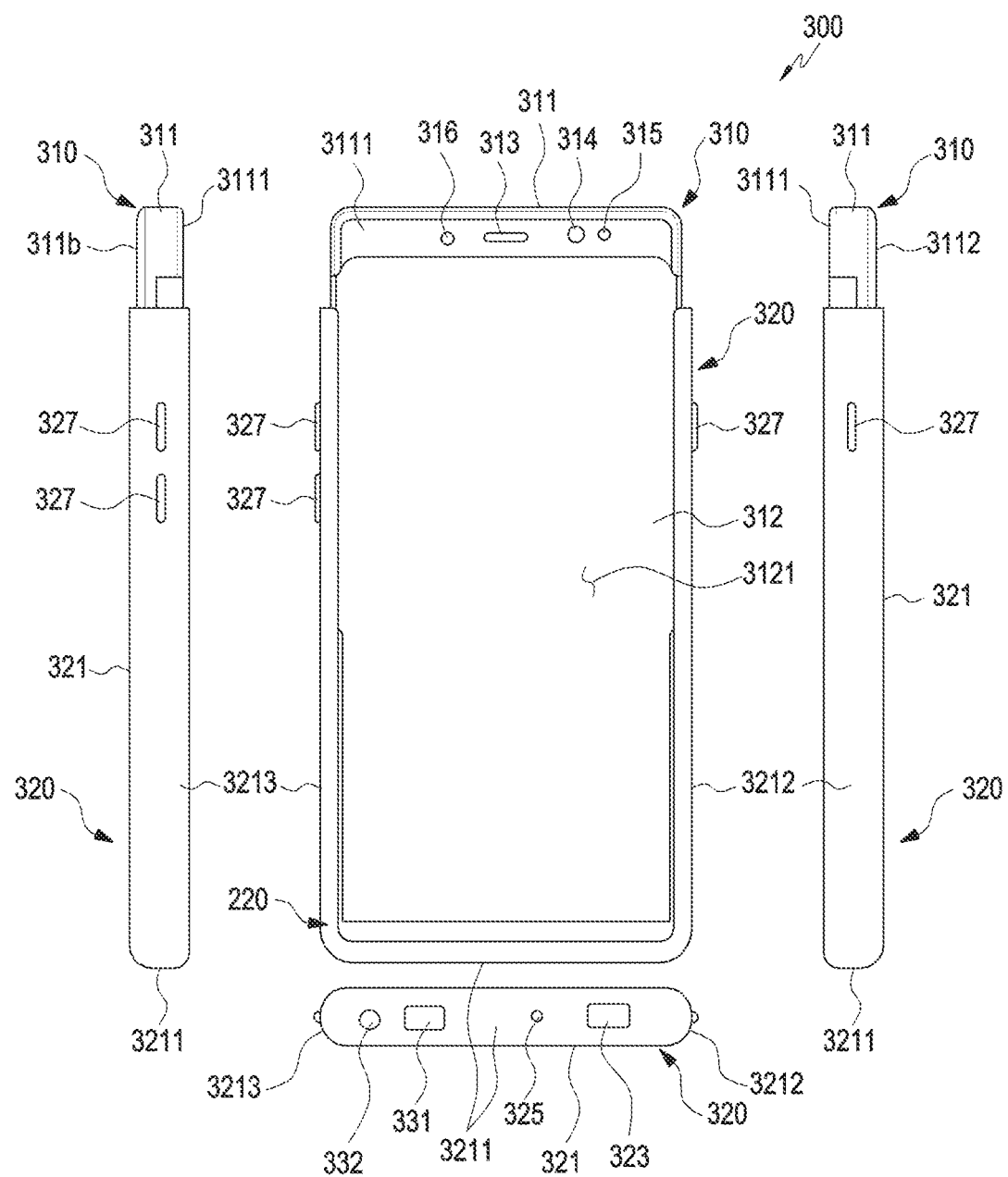
FIG. 3 is a diagram illustrating an example electronic device in a closed state according to an embodiment.
Figure 4:
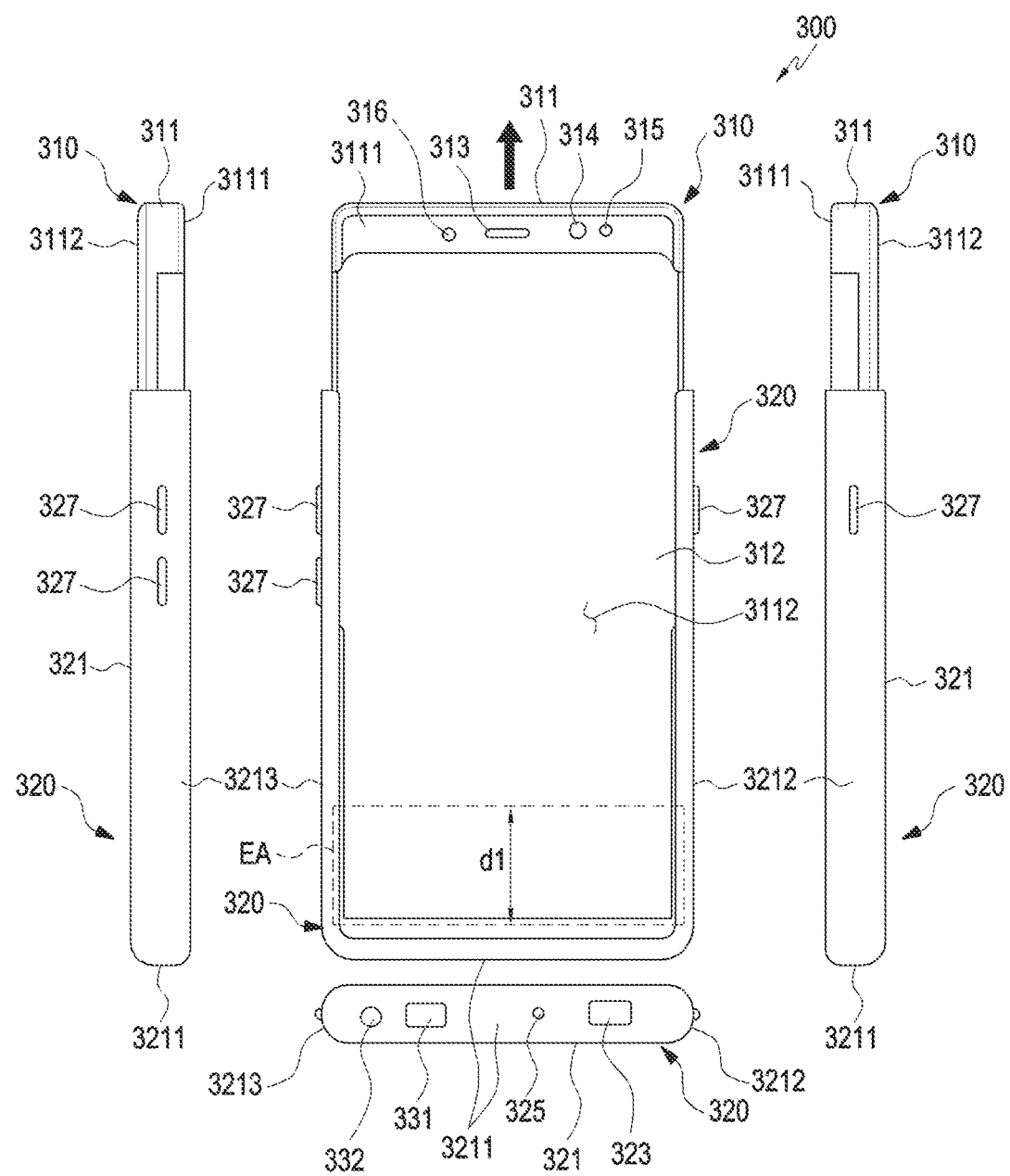
FIG. 4 is a diagram illustrating the electronic device of FIG. 3 in an open state, according to an embodiment.
Figure 5:
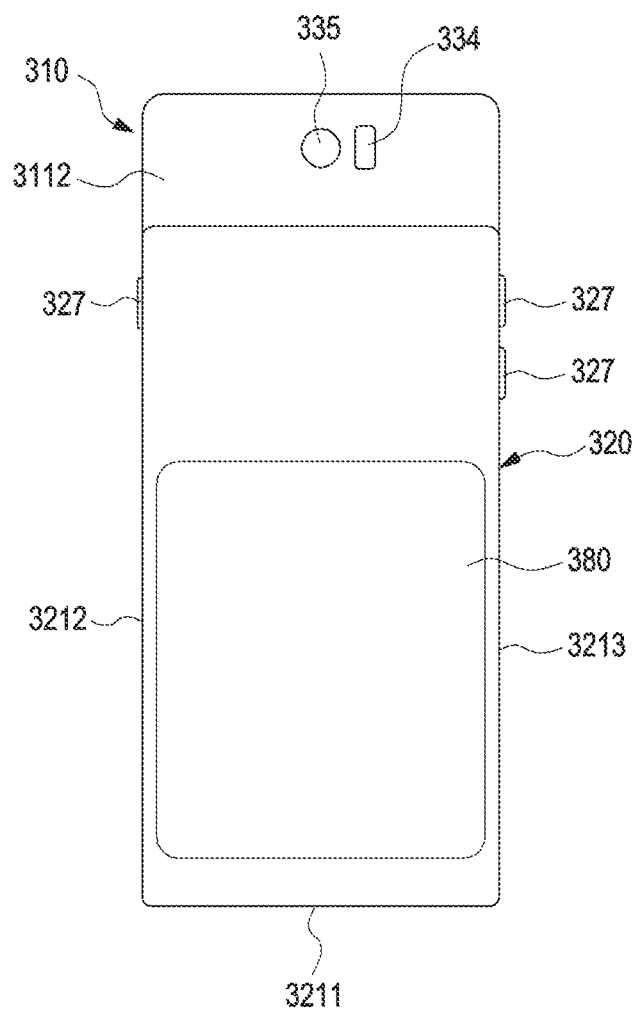
FIG. 5 is a rear perspective view illustrating the electronic device of FIG. 3 according to an embodiment.

FIGS. 3 and 4 are diagrams illustrating an open state and a closed state of an example electronic device according to an embodiment. FIG. 5 is a rear perspective view illustrating an example electronic device according to an embodiment.

FIG. 3 illustrates a closed state of a first structure 310 with respect to a second structure 320, and FIG. 4 illustrates an open state of the first structure 310 with respect to the second structure 320.

Referring to FIGS. 3, 4, and 5, an electronic device 300 may include the first structure 310 and the second structure 320 disposed so as to be movable with respect to the first structure 310. According to an embodiment, the first structure 310 may move back and forth by a predetermined distance d1 along directions shown on the second structure 320.

According to an embodiment, the first structure 310 includes a first plate 311 that includes a first surface 3111 and a second surface 3112 facing away from the first surface 3111. According to an embodiment, the second structure 320 may include a second plate 321, a first side wall 3211 extending from the second plate 321, a second side wall 3212 extending from the first side plate 3211 and the second plate 321, and a third side wall 3213 extending from the first side wall 3211 and the second plate 321 and positioned parallel with the second side wall 3212, or a second rear plate 380 (e.g., a rear window). According to an embodiment, the second plate 321, the first side wall 3211, the second side wall 3212, and the third side wall 3213 may be formed to have an opening at a side thereof to receive the first structure 310. According to an embodiment, the second side wall 3212 or the third side wall 3213 may be omitted. According to an embodiment, the second plate 321, the first side wall 3211, the second side wall 3212, or the third side wall 3213 may be integrally formed with each other. As another example, the second plate 321, the first side wall 3211, the second side wall 3212, or the third side wall 3213 may be formed individually and joined together. According to an embodiment, the second rear plate 380 may cover at least part of the display 312.

According to an embodiment, the first structure 310 may be moved in an open state or closed state with respect to the second structure 320 in a first direction parallel with the second plate 321 and the second side wall 3212 to be positioned a first distance away from the first side wall 3211 in the closed state of the first structure 310 and be positioned a second distance away from the first side wall 3211 in the open state, wherein the second distance is larger than the first distance.

According to an embodiment, the electronic device 101 may include at least one or more of a display 312, audio modules 313 and 323, camera modules 315 and 335, an indicator 316 (e.g., a light emitting diode (LED) device), sensor modules 314 and 334, a key input device 327, or connector holes 331 and 332.

According to an embodiment, the display 312 may include a flat portion 3121 crossing and extending at least a portion of the first surface 3111 and disposed on the first surface 3111 and a bendable portion extending from the flat portion 3121 to a space between the first side wall 3211 and the first structure 310 in the closed state. According to an embodiment, as viewed from above the flat portion 3121, the bendable portion may be configured to at least partially be moved a predetermined marked distance d1 to the flat portion 3121 to substantially form a flat surface between the flat portion 3121 and the first side wall 3211 when the first structure 310 is moved from the closed state to the open state. The display 312 may be disposed to be coupled with, or adjacent to, a touch detecting circuit, a pressure sensor capable of measuring the strength (pressure) of touches, and/or a digitizer for detecting a magnetic field-type stylus pen.

According to an embodiment, the audio modules 313, 323, and 325 may include speaker holes 313 and 323 and a microphone hole 325. The speaker holes 313 and 323 may include a receiver hole 313 or an external speaker hole 323. The microphone hole 325 may have a microphone inside to obtain external sounds. According to an embodiment, there may be a plurality of microphones to be able to detect the direction of a sound. According to an embodiment, the speaker holes 313 and 323 and the microphone hole 325 may be implemented as a single hole, or speakers (e.g., piezo electric speakers) may be included without the speaker holes 313 and 323. According to an embodiment, the receiver hole 313 may be disposed in the first structure 310, and the external speaker hole 323 or the microphone hole 325 may be disposed in the second structure 320. According to an embodiment, the external speaker hole 323 may be disposed on the second surface 3112 of the first plate 311 or on a side surface of the first structure 310. According to an embodiment, the microphone hole 325 may be disposed on a side surface of the first structure 310.

According to an embodiment, the sensor modules 314 and 334 may generate an electrical signal or data value corresponding to an internal operating state or external environmental state of the electronic device 101. The sensor modules 314 and 334 may include a first sensor module 314 (e.g., a proximity sensor) disposed on, e.g., the first surface 3111 of the first plate 311 and/or a second sensor module (e.g., a fingerprint sensor) (not shown) disposed on the second surface 3112 of the first plate 311 and/or a third sensor module 334 (e.g., a heart rate monitor (FIRM) sensor). The electronic device 101 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 315 and 335 may include a first camera device 315 disposed on the first surface 3111 of the first plate 311 and a second camera device 335 disposed on the second surface 3112. The first camera device 315 or the second camera device 335 may include one or more lenses, an image sensor, and/or an image signal processor. According to an embodiment, the second camera device 335 may be disposed on one surface of the second structure 320.

According to an embodiment, the key input device 327 may be disposed on the second side wall 3212 or third side wall 3213 of the second structure 320. The electronic device 101 may include a key input device (not shown), e.g., a home key button or a touchpad disposed around the home key button. According to an embodiment, at least a portion of the key input device 327 may be positioned on an region of the first structure 310.

According to an embodiment, the indicator 316 may be disposed on the first surface 3111 of the first plate 311. The indicator 316 may provide, e.g., state information about the electronic device 101 in the form of light and may include an LED.

According to an embodiment, the connector holes 331 and 332 may include a first connector hole 331 for receiving a connector (e.g., a universal serial bus (USB) connector) for transmitting or receiving power and/or data to/from an external electronic device and/or a second connector hole 332 (or, an earphone jack) for receiving a connector for transmitting or receiving audio signals to/from the external electronic device. According to an embodiment, the first connector hole 331 or the second connector hole 332 may be disposed on the first side wall 3211 of the second structure 320. According to an embodiment, the first connector hole 331 or the second connector hole 332 may be formed on a side wall of the first structure 310.

Figure 6:
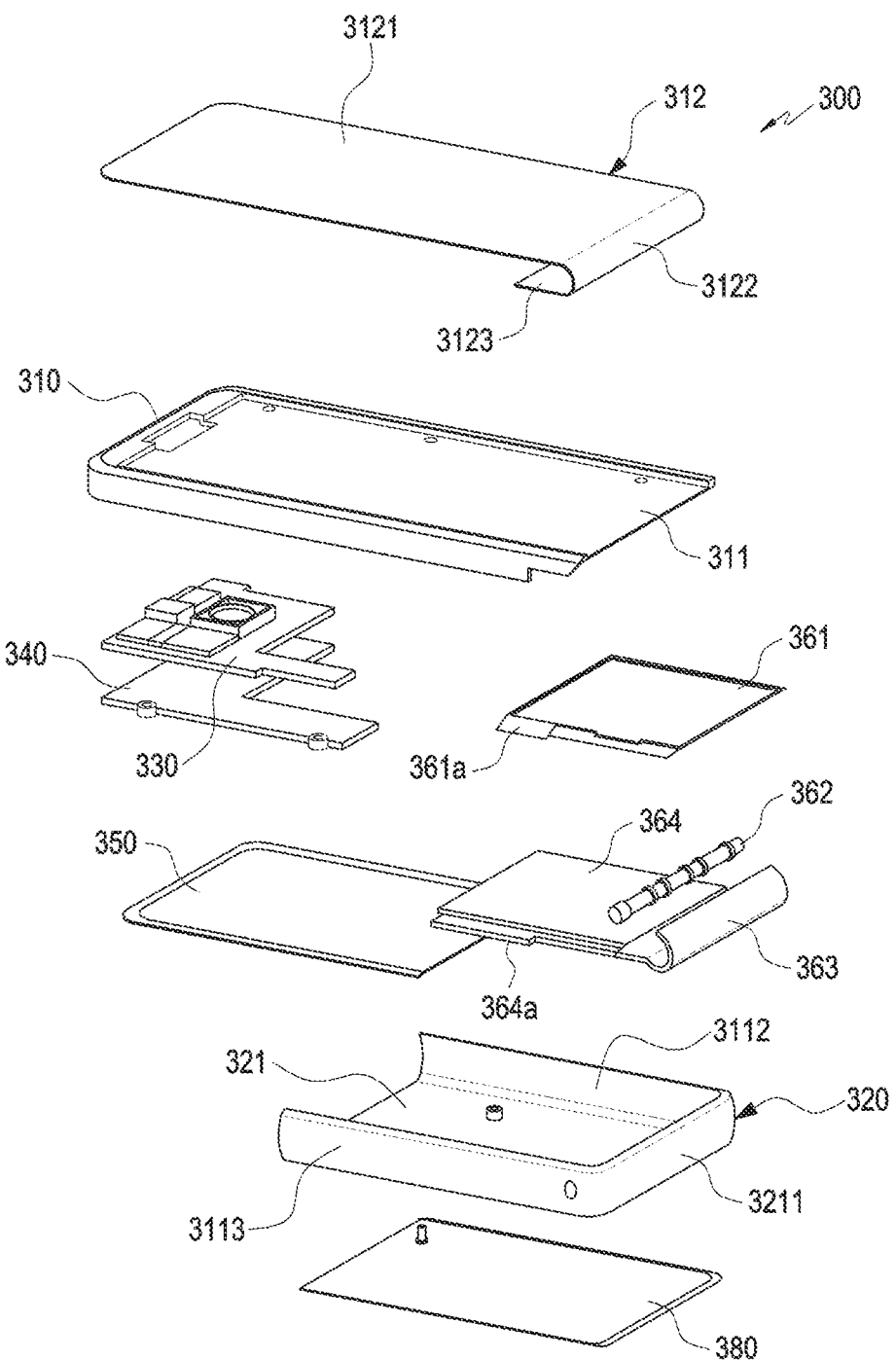
FIG. 6 is an exploded perspective view illustrating the electronic device of FIG. 3 according to an embodiment.

FIG. 6 is an expanded perspective view illustrating an example electronic device according to an embodiment. Referring to FIG. 6, an electronic device 300 may include a display 312, a first structure 310, a first plate 311, a second structure 320, a second plate 321, a printed circuit board 330, a supporting member 340 (e.g., a rear case), a first rear plate 350, a first hinge plate 361, a roller 362, a second hinge plate 364, or a second rear plate 380 (e.g., a rear window). According to an embodiment, the electronic device 100 may exclude at least one (e.g., the first supporting member 340 or the first rear plate 350) of the components or may add other components.

The display 312 may include a first surface 3121, a second surface 3122, and a third surface 3123. According to an embodiment, the screen display region may be varied based on the region of exposure. The first surface 3121 and the third surface 3123 may form flat surfaces, and the second surface 3122 may form a bent surface.

The first surface 3111 may include the first plate 311. The first structure 310 may be formed of, e.g., a metal and/or non-metallic material (e.g., polymer). The display 312 may be joined onto one surface of the first plate 311, and the printed circuit board 33 may be joined onto the opposite surface of the first plate 311. The first plate 311 may be connected to a side of a multi-bar structure 363 which is connected with at least the second surface 3122. The first structure 310 may fasten the second hinge plate 364.

The first hinge plate 361 may support the multi-bar structure 363 when the display 312 expands. The first hinge plate 361 and a first hinge plate fastener 361a may be integrally formed with each other. The first hinge plate fastener 361a may be connected to a second hinge plate fastener 364a provided in the second hinge plate 364.

The roller 362 may guide or support the multi-bar structure 363 in a predetermined radius. The roller 362 may be connected to the second hinge plate fastener 364a or the first hinge plate 361.

The multi-bar structure 363 may be formed with multiple straight bars. The multi-bar structure 363 may at least partially support the second surface 3122 of the display 312. A side of the multi-bar structure 363 may be connected to the second hinge plate 364, and its opposite side may be connected to the first structure 310.

The second hinge plate 364 may support the third surface 3123 of the display 312. The second hinge plate 364 may be moved to expand the screen while interworking with the multi-bar structure 363 when the display 312 expands. The second hinge plate 364 may be formed as a part separate from the second hinge plate fastener 364a. The second hinge plate 364 may be affixed to the first structure 310 to allow the second hinge plate 364 to slide.

The second structure 320 may be formed to surround at least a portion of the first structure 310, the second hinge plate 364, and the multi-bar structure 363. According to an embodiment, the second structure 320 may include a second plate 321, a first side wall 3211 extending from the second plate 321, a second side wall 3212 extending from the first side plate 3211 and the second plate 321, and a third side wall 3213 extending from the first side wall 3211 and the second plate 321 and positioned parallel with the second side wall 3212. The second structure 320 may form a space not overlapping the multi-bar structure 363 to receive components, such as an antenna. The second structure 320 may include a second rear plate 380 to at least partially cover the third surface 3123 of the display 312.

The second rear plate 380 may include a material that does not transmit when there is no need to display 312 information on the third surface 3123 of the display 312. As another example, the second rear plate 380 may be formed of a light-transmittable material to display 312 information on the third surface 3123 of the display 312. The second rear plate 380 may be integrally formed with the second structure 320.

The supporting member 340 may be disposed between the printed circuit board 330 and the first rear plate 350.

A processor, memory, and/or interface may be mounted on the printed circuit board 330. The processor may include one or more of, e.g., a central processing unit, an application processor, a graphics processing device, an image signal processing, a sensor hub processor, or a communication processor. The first structure 310 may be guided to move through the first hinge plate 361 when the display 312 expands or shrinks.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 100 with an external electronic device and may include a USB connector, an SD card/multi media card (MMC) connector, or an audio connector.

Figure 7A:
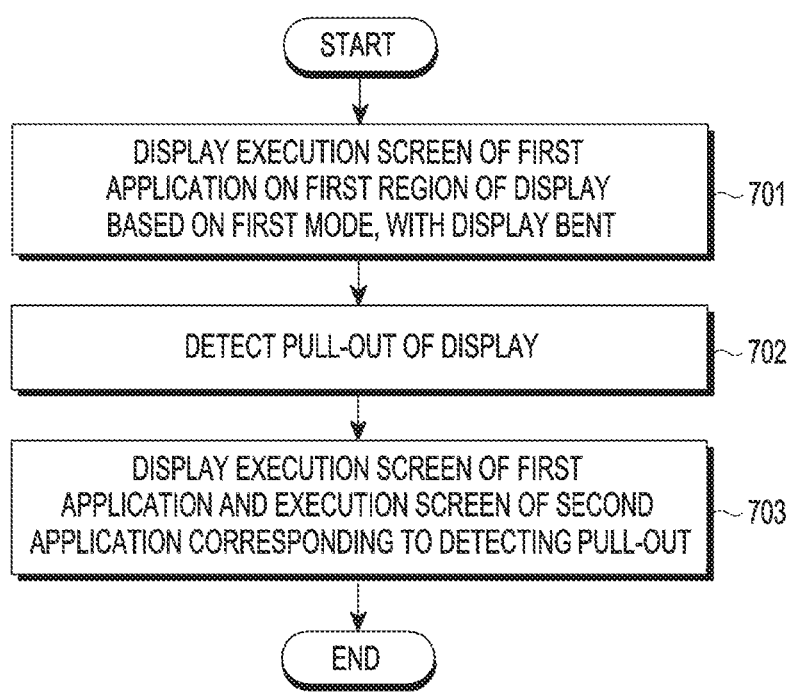
FIG. 7A is a flowchart illustrating an example operation of displaying an execution screen of an application of an electronic device according to an embodiment.

FIG. 7A is a flowchart illustrating an example operation of displaying an execution screen of an application of an electronic device according to an embodiment.

Figure 7B:
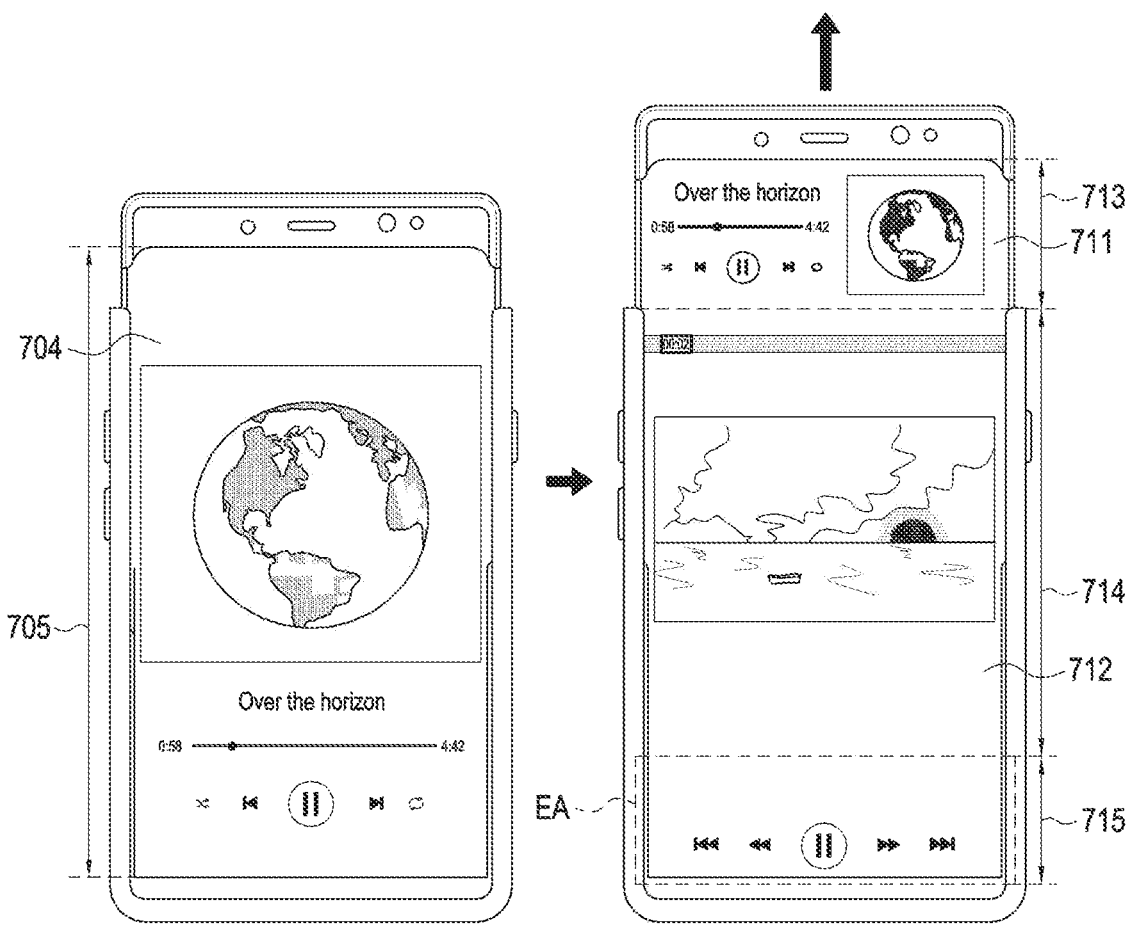
FIG. 7B is a diagram illustrating an example operation of displaying an execution screen of an application of an electronic device according to an embodiment.

FIG. 7B is a diagram illustrating an example operation of displaying an execution screen of an application on an electronic device according to an embodiment.

Figure 7C:
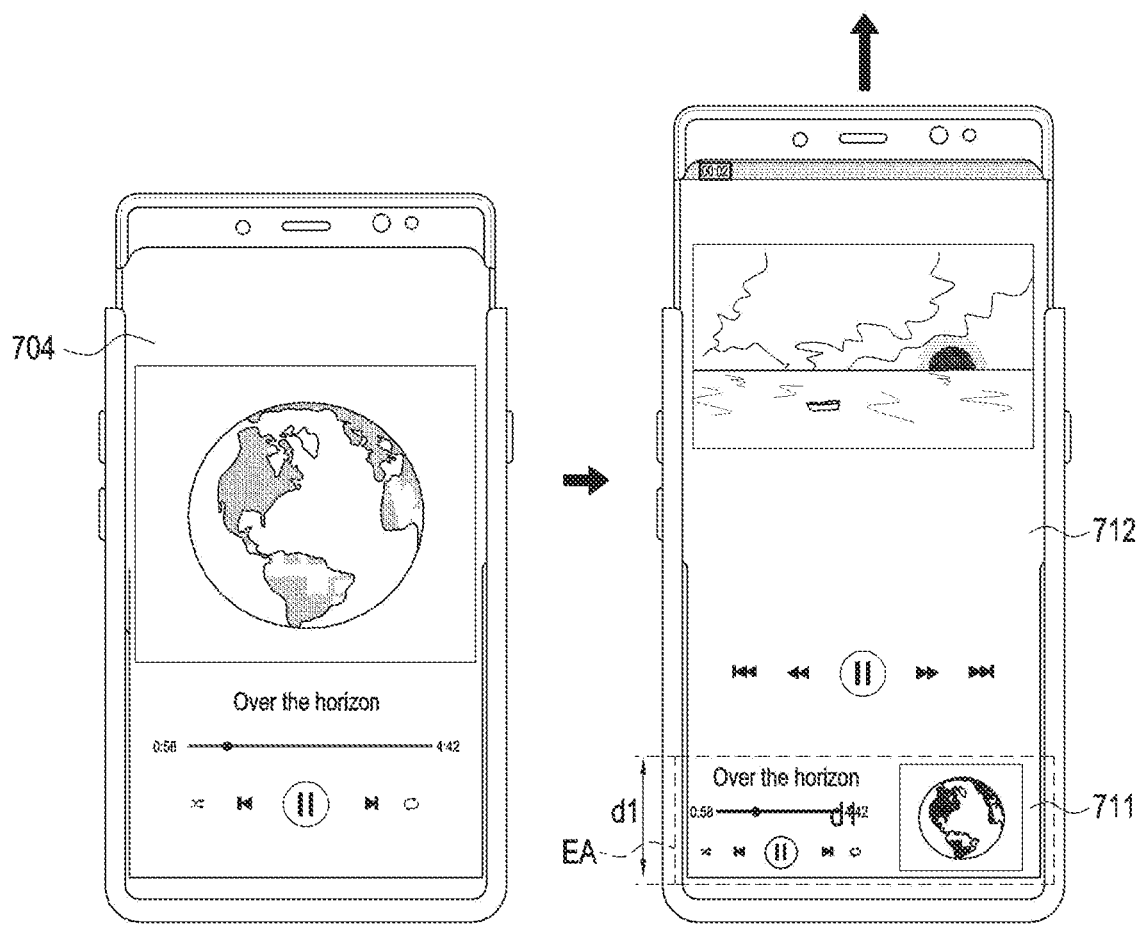
FIG. 7C is a diagram illustrating an example operation of displaying an execution screen of an application of an electronic device according to an embodiment.

FIG. 7C is a diagram illustrating an example operation of displaying an execution screen of an application on an electronic device according to an embodiment.

Referring to FIG. 7A, in operation 701, an electronic device 101 (e.g., the processor 120) may display an execution screen 704 of a first application on a first region, externally exposed, of the display 312 based on a first mode, with the display 312 bent.

Referring to FIG. 7B, when the electronic device 101 is in the closed state, the electronic device 101 (e.g., the processor 120) may display an execution screen 704 of the application on the first region 705 of the display 312. The first region 705 may refer, for example, to an area exposed from the first structure 310 or second structure 320 when the electronic device 101 is in the closed state.

Referring back to FIG. 7A, in operation 702, the electronic device 101 (e.g., the processor 120) may detect a pull-out of the display 312.

In operation 703, the electronic device (e.g., the processor 120 of FIG. 1) may display, an execution screen of a first application and an execution screen of a second application corresponding to detecting the pull-out. As an example, corresponding to detecting the pull-out, the electronic device 101 (e.g., the processor 120) may display the execution screen 711 of the first application on at least a portion of the first region 713 of the display based on a second mode, with the display 312 unbent by the pull-out, and the execution screen 712 of the second application, which differs from the first application, on another portion of the first region 714 of the display and a second region 715 of the display exposed to the outside by the pull-out.

Referring back to FIG. 7B, when the electronic device 101 changes its state from the closed state to the open state, the electronic device 101 (e.g., the processor 120) may display the execution screen 711 of the application on at least a portion of the first region 713 of the display 312 of the electronic device 101, corresponding to the change in state. For example, the display region of the execution screen 711 attic application may be set to a top area of the first region 705, and the execution screen 711 of the application may be displayed on the area exposed by the pull-out of the display 312.

The electronic device 101 (e.g., the processor 120) may display the execution screen 712 of the different application on the second region 715. The second region 715 may be the region exposed to the outside when the electronic device 101 changes its state from the closed state to the open state.

The at least portion of first region 713 may be substantially the same in shape or size as the second region 715.

As shown in FIG. 7B, the application execution screen 704 may differ in configuration from the application execution screen 711. For example, the application execution screen 704 may be displayed based on the first mode, and the application execution screen 711 may be displayed based on the second mode. Each mode is described below in greater detail.

Corresponding to a pull-in of the display 312, the electronic device 101 may stop displaying the application execution screen 711 on at least a portion (e.g., the top area) of the first region 713 and display the application execution screen 704 on the first region 705.

Referring to FIG. 7C, when the electronic device 101 changes its state from the closed state to the open state, the electronic device 101 (e.g., the processor 120) may display the execution screen 711 of the first application on the second region 715 of the display 312 of the electronic device 101 and the execution screen 712 of the second application on the first region 705, corresponding to the change in state.

The above-described operations of displaying application execution screens on the electronic device 101 allow for applications to be used in various manners as the electronic device 101 is in the open state or closed state. For example, according to an embodiment, when the electronic device 101 changes its state from the closed state to the open state, the execution screen of a particular application displayed on the first region 705 of the electronic device 101 may be actively relocated, rendering it possible to secure a region for executing another application. This enables easier and seamless use of both a particular application and another application on the electronic device 101, alleviating hassle upon running the other application.

Now described in detail are an electronic device 101 and a method for operating the electronic device 101 according to an embodiment.

According to an embodiment, the physical configuration of the electronic device 101 is described first.

Figure 8:
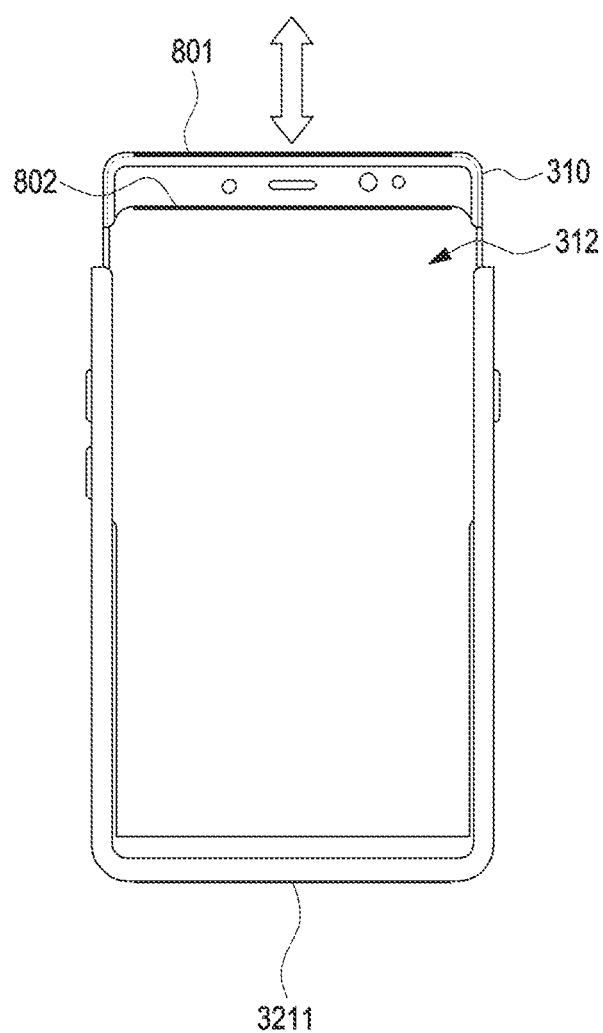
FIG. 8 is a diagram illustrating an example electronic device as viewed in a direction perpendicular to a first plate according to an embodiment.

FIG. 8 is a diagram illustrating an electronic device 101 as viewed in a direction perpendicular to a first plate 311 according to an embodiment.

Referring to FIGS. 3 to 6 and 8, the electronic device 101 may include a first structure 310 including a first plate 311 and a first outer wall 801, a display 312 including a top end 802, a second plate 321 including a first side wall 3211, a roller, and a multi-bar structure. Although not shown, the electronic device 101 may further include a predetermined sensor unit.

The configuration of the electronic device 101 is described below in greater detail.

According to an embodiment, the first structure 310 may support the display 312. In other words, the display 312 may be placed on the first structure 310.

The first structure 310 may have a predetermined outer shape. The first structure 310 may include the first plate 311 which has a flat shape and is able to support the display 312. The first structure 310 may include the first outer wall 801. The first outer wall 801 may refer, for example, to a side wall of the first structure 310 farthest away from the first side wall 3211 of the second plate 321 when the first structure 310 and the second plate 321 are joined together. The first outer wall 801 and the first plate 311 may be connected together.

According to an embodiment, the second plate 321 may support the physical configuration provided in the electronic device 101. For example, the first structure 310 may be supported by the second plate 321.

According to an embodiment, the display 312 may be pulled in or out. The pull-in and pull-out of the display 312 are described below in greater detail.

The display 312 may include the top end 802 adjacent to the first outer wall 801 of the first plate 311. The top end 802 may be referred to, for example, as the edge most adjacent to the first outer wall 801 of the first structure 310 among the edges of the display 312.

According to an embodiment, the roller may rotate. As the roller rotates, the display 312 may be pulled in or out. To rotate the roller, the electronic device 101 may further include a predetermined motor. The motor may come in an electronic or mechanical type and be integrally formed with the roller. The roller may be rotated by the attracting force of the electronic device 101 or be assisted in operation by a mechanism or structure, such as a spring. In this case, the electronic device 101 may exclude the motor.

According to an embodiment, the multi-bar structure may support the display 312 to pull in or out the display 312. The multi-bar structure may slide in a direction as the roller rotates.

According to an embodiment, the sensor unit may detect variations in electrical or physical property. Detecting variations in electrical property may refer, for example, to detecting variations in the power applied to a particular thing or in the voltage or current applied to the particular thing. Detecting variations in physical property may refer, for example, to detecting the movement or transformation of a particular thing. Thus, the sensor unit may detect a pull-in or pull-out of the display 312. Detecting a pull-in or out of the display 312 by the sensor unit is described below in detail. The sensor unit may be implemented physically or electronically. When the sensor unit is implemented physically, the sensor unit may be implemented as a sensor with a predetermined physical shape, and when the sensor unit is implemented electronically, the sensor unit may be implemented as a predetermined algorithm or program stored in a memory or configured in a processor to perform the above-described operations of the sensor unit.

Regions of the display 312 of the electronic device 101, which are defined in the closed state or open state, are described below.

Figures 9A, 9B:
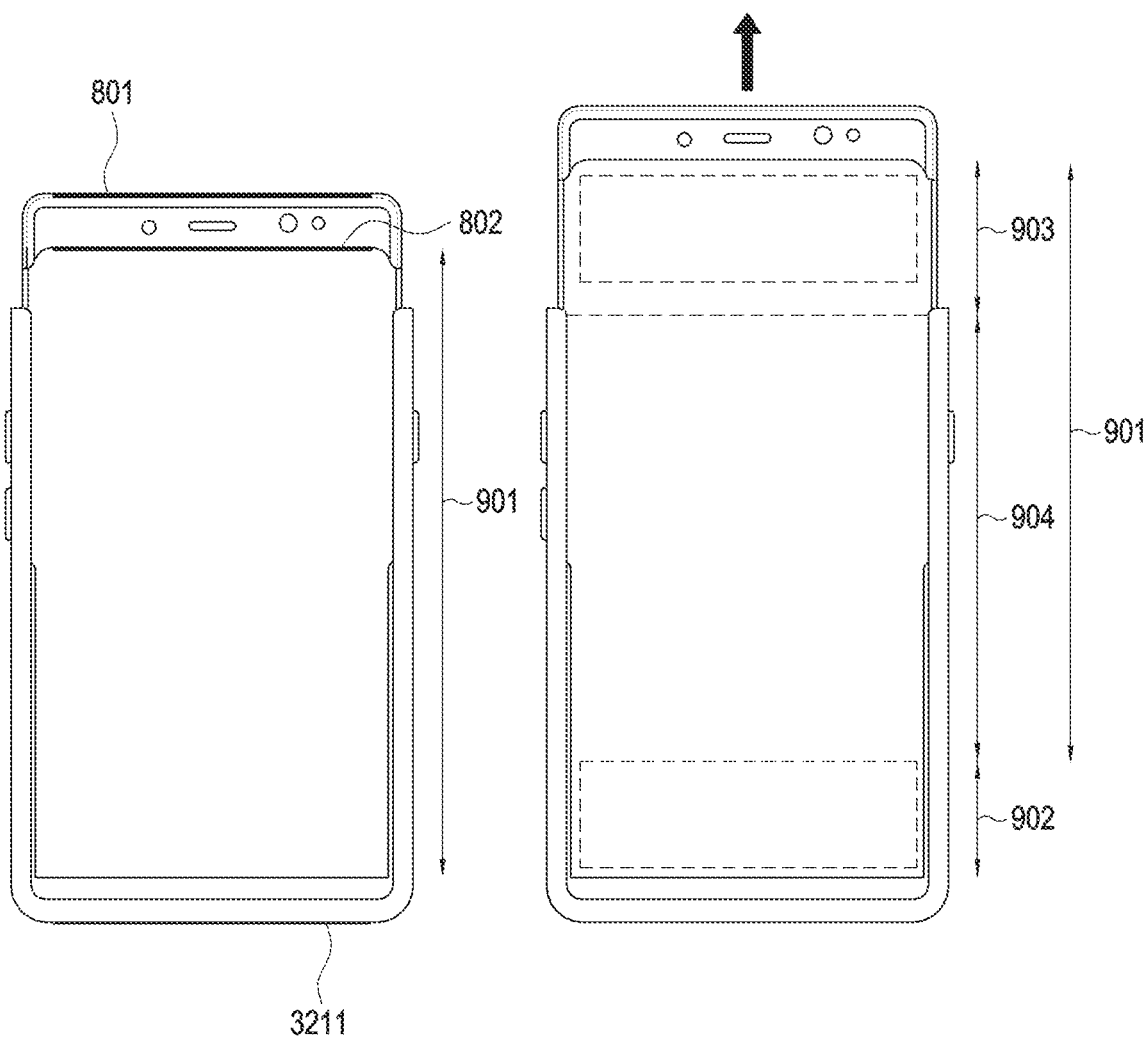
FIGS. 9A and 9B are diagrams illustrating regions of an electronic device according to an embodiment.

FIGS. 9A and 9B are diagrams illustrating example regions of an electronic device 101 according to an embodiment.

Referring to FIGS. 9A and 9B, according to an embodiment, regions of the display 312 of the electronic device 101 may be described.

Referring to FIG. 9A, according to an embodiment, the electronic device 101 (e.g., the processor 120) may expose a first region of the display 312 of the electronic device 101 to the outside when the electronic device 101 is in the closed state.

According to an embodiment, the first region 901 may referred, for example, to as an overall region, exposed to the outside, of the display 312 of the electronic device 101 when the electronic device 101 is in the closed state. When the electronic device 101 is in the closed state, the first region 901 may be a region unhidden by the first plate 311. Specifically, when the display 312 is in a bent position, the first region 901 of the display 312 may be flat and be exposed to the outside, and a second region 902 of the display 312 may be at least partially bent and not be exposed to the outside.

According to an embodiment, when the electronic device 101 is in the closed state, the first region 901 may be a flat portion of the display 312 of the electronic device 101. When the electronic device 101 is in the closed state, the first region 901 may be an exposed region of the display 312 between the first side wall 3211 and the first plate 311 of the electronic device 101.

On the other hand, the first region 901 may be a region where the execution screen of a particular application is displayed when the electronic device 101 is in the closed state.

Referring to FIG. 9B, according to an embodiment, when the electronic device 101 is in the open state, the display 312 of the electronic device 101 may be exposed through both the first region 901 and the second region 902, and the first region 901 may include a portion 903 and another portion 904.

No repetitive description is made of the first region 901.

According to an embodiment, when the electronic device 101 is in the open state, the second region 902 may be referred to, for example, as a region exposed as the display 312 is pulled out. When the electronic device 101 is in the open state, the second region 902 may be a region of the display 312 pulled out from the first side wall 3211 to the first outer wall 801.

When the electronic device 101 is in the open state, the second region 902 may be a region between the first region 901 and the first side wall 3211.

The second region 902 may be a region connected to the first region 901.

When the electronic device 101 is in the closed state, the second region 902 may be a region including a curved surface of the display 312 and be a region set to include a flat surface as the display 312 is pulled out. When the electronic device 101 is in the closed state, the second region 902 may be a non-exposed region of the display 312. For example, when the display 312 is pulled out, the second region 902 may be in an unbent state, thus allowing the overall display 312 to be substantially flat. The second region 902 may be a region hidden by the first plate 311 when the electronic device 101 is in the closed state and may be pulled out and exposed when the electronic device 101 is in the open state.

According to an embodiment, the portion 903 of the first region 901 may be referred, for example, to as a region corresponding to the region exposed as the display 312 is pulled out when the electronic device 101 is in the open state. In other words, the portion 903 of the first region 901 may be a region corresponding to the second region 902. The portion 903 of the first region 901 may substantially the same in shape as the second region 902. The portion 903 of the first region 901 is described below in greater detail in connection with displaying the execution screen of an application.

According to an embodiment, the other portion 904 of the first region 901 may be a region positioned between the portion 903 of the first region 901 and the second region 902. The other portion 904 of the first region 901 is described below in greater detail in connection with displaying the execution screen of an application.

Although the portion 903 of the first region 901 is referred to as a top region including the top end 802 of the display 312 and is substantially the same in shape and size as the second region 902 as shown in FIG. 9B, this is merely an example, and the position, shape, or size of the second region 902 is not limited thereto.

The execution screen of an application may be displayed on the first region 901, second region 902, and the portion 903 of the first region 901.

Applications executed on the electronic device 101 are described in greater detail below.

FIGS. 10A, 10B, 10C, 11A and 11B are diagrams illustrating example application modes regarding resource allocations or display orientations according to an embodiment.

According to an embodiment, an application may be executed based on a predetermined application mode. In other words, an electronic device may execute an application based on a predetermined application mode. The application may have a predetermined state according to the application mode. According to an embodiment, there may be provided a plurality of application modes including modes regarding execution states and modes regarding display orientations.

Described below in greater detail are the execution state-related modes, display orientation-related modes, and execution modes of the application.

The execution state-related modes may be referred to as modes to determine execution states of the application. In other words, the electronic device 101 may execute an application in a predetermined execution state-related mode, and the application may have a predetermined application execution state according to the execution state-related mode. The execution state of the application may include the position where the execution screen of the application is displayed, the time when the application is executed, and the resource allocation to the application. The application execution time may be determined depending on a pulled-out of the display. For example, the application execution time may be at least one point in time before and after the display of the electronic device is pulled out.

The application execution state determined by the execution state-related mode is described below in greater detail.

Referring to FIGS. 10A, 10B and 10C, according to an embodiment, the execution state-related modes may include a foreground running mode 1001 (FIG. 10A), a paused ground running mode, a background running mode, and an extended running mode that may be an extended foreground running mode 1003 (FIG. 10B) or an extended background running mode 1004 (FIG. 10C).

The foreground running mode may refer, for example, to a mode in which the execution screen of the application is displayed on the display and the application keeps on running.

The paused ground running mode may refer, for example, to a mode in which the application execution screen is not displayed on the display and the application stops running.

The background running mode may refer, for example, to a mode in which the application execution screen is not displayed on the display and the application keeps on running.

The extended running mode may refer, for example, to modes in which the application execution screen is displayed on the display and the application keeps on running. The extended running mode may be distinguished from the foreground running mode. For example, an application executed based on the extended running mode may differ in at least one of the position of execution screen, time of execution, and resource allocation from when executed based on the foreground running mode. This is described below in greater detail.

According to an embodiment, at least one of whether the display is pulled out, the region where the execution screen of the application is displayed, and the resource allocation to the application may be determined depending on the execution state-related mode for the application as set forth above. In other words, the execution state-related mode for the application may be determined depending on at least one of whether the display is pulled out, the region where the application execution screen is displayed on the display, and the resource allocation to the application.

Described first are example execution state-related modes for the application depending on whether the display is pulled out.

For example, according to an embodiment, when the electronic device 101 runs an application before the display is pulled out, the electronic device 101 may run the application based on at least one of the foreground running mode, paused ground running mode, and background running mode. When the electronic device 101 runs the application after the display is pulled out, the electronic device 101 may run the application based on the extended running mode.

Described now are example execution state-related modes for the application depending on the region where the application execution screen is displayed.

For example, according to an embodiment, when the electronic device 101 displays the application execution screen on the overall first region 901, the electronic device 101 may run the application based on at least one of the foreground running mode, paused ground running mode, and background running mode. When the electronic device 101 displays the application execution screen on at least one of the other portion 904 of the first region 901 and the second region 902, the electronic device 101 may run the application based on at least one of the foreground running mode, paused ground running mode, and background running mode. When the electronic device 101 displays the application execution screen on the portion 903 of the first region 901, the electronic device 101 may run the application based on the extended running mode.

According to an embodiment, the above-described descriptions may be mixed.

For example, when the electronic device 101 displays the application on the first region 901 of the display which is displayed before the display is pulled out, the execution state-related mode for the application may be determined as at least one of the foreground running mode, paused ground running mode, and the background running mode. In other words, before the display is pulled out, the electronic device 101 may run the application based on at least one of the foreground running mode, paused ground running mode, and background running mode and display the application execution screen on the first region 901.

When the application execution screen is displayed on at least one of the other portion 904 of the first region 901 and the second region 902 after the display is pulled out, the electronic device 101 may run the application based on at least one of the foreground running mode, paused ground running mode, and background running mode. In other words, after the display is pulled out, the electronic device 101 may run the application based on at least one of the foreground running mode, paused ground running mode, and background running mode and display the application execution screen on the first region 902 and display the application execution screen on at least one of the other portion 904 of the first region 901 and the second region 902.

When the application execution screen is displayed on the portion 903 of the first region 901 after the display is pulled out, the electronic device 101 may run the application based on the extended running mode. In other words, after the display is pulled out, the electronic device 101 may run the application based on the extended running mode and display the application execution screen on the portion 903 of the first region 901.

Described now are example execution state-related modes for the application depending on the resource allocation to the application.

According to an embodiment, resource allocation may be set to the application per execution state-related mode as set forth above. In other words, according to an embodiment, the electronic device 101 may run an application with a different resource allocation based on the execution state-related mode.

According to an embodiment, resources may be referred to, for example, as physical or virtual components available in the electronic device 101. The physical components may include, e.g., primary storage and an input/output display device. The virtual components may include files.

According to an embodiment, the electronic device 101 may adjust the allocation of the resources per application mode. In other words, the electronic device 101 may control physical and virtual components allocated to the application.

For example, adjusting resource allocations may be controlling, by the electronic device 101, the computation load of the application processor (AP) or graphics processing unit (GPU) to display the execution screen of the application or the operation of the display driver IC (DM. As the resource allocations are adjusted, the frequency of displaying the driving power of the DDI or scan signals to display the application execution screen may be adjusted. As the resource allocations are adjusted, the screen display properties to display the application execution screen may be adjusted. The screen display properties may include the frame rate or refresh rate to display a plurality of frames 1010. The frame rate may refer, for example, to the number of frames to be rendered and displayed for one second by adjusting the computation load of the AP or GPU. The refresh rate may refer, for example, to the number of times at which the screen is updated and displayed for one second. As more resource allocations are made to the application, the frame rate and the refresh rate may increase.

As another example, the operation of the application may be controlled by adjusting the resource allocations. For example, adjusting the resource allocations may be adjusting the application update cycle. As resource allocations to the application decrease, the application update cycle may get longer. In other words, as resource allocations to the application decrease, the application update may slow down.

Referring to FIGS. 10A, 10B and 10C, the resource allocation to the application run based on the foreground running mode 1001 may be larger than the resource allocation to the application run based on the background running mode, paused ground running mode, and extended running mode. Thus, the execution screen of the application run based on the foreground running mode 1001 may have a higher frame rate and refresh rate than based on the other modes. The update cycle of the application run based on the foreground running mode 1001 may be shorter than based on the other modes. The foreground running mode may be a mode in which the application is being displayed on the display 312 and a relatively larger resource allocation is given.

The resource allocation to the application run based on the extended foreground running mode 1003 may be relatively larger than the resource allocation to the application run based on the extended background running mode 1004. Accordingly, the application run based on the extended foreground running mode 1003 may have characteristics that come from having more resource allocations than the application run based on the extended background running mode 1004. The extended foreground running mode may be a mode in which the application is being displayed on the display 312, and more resource allocations than by the extended background running mode 1004 and fewer resource allocations than by the foreground running mode are given. The extended background running mode may be a mode in which the application is being displayed on the display 312 and fewer resource allocations than by the extended foreground running mode 1003 are given. No repetitive description thereof is presented.

According to an embodiment, the descriptions of resource allocation may be mixed with at least one of the embodiments regarding the application execution time and the region where the application execution screen is displayed. For example, after the display is pulled out, the electronic device 101 may run a first application and display an execution screen of the first application on the portion of the first region based on the extended running mode and run a second application and display an execution screen of the second application on the other portion of the first region and the second region based on at least one of the foreground running mode, paused ground running mode, and background running mode. In this case, the resource allocation to the first application may be smaller than the resource al location to the second application.

According to an embodiment, the electronic device 101 in the closed state may display the execution screen 1401 (see, e.g, FIG. 14) of the first application in a first mode which is any one of the plurality of modes described above. The electronic device 101 may detect a transition to the open state and may accordingly display the execution screen 1903 (see, e.g., FIG. 19) of the second application in a second mode different from the first mode among the plurality of modes. Various examples of mode transition are described below in greater detail.

According to an embodiment, the electronic device 101 may determine an execution state-related mode based on information about a running application. According to an embodiment, the application-related information may be referred to, for example, as information for identifying the properties of the application. The application-related information may include application property information, an application key, and an application identity (ID). The resource allocation to the application may be determined based on the application-related information. An execution state-related mode for the application may be determined based on the determined resource allocation, which is described below in greater detail.

Example application modes regarding display orientations are described below.

The execution screen of an application may be displayed on the display 312 of the electronic device 101 in a predetermined orientation based on the display orientation-related mode. Specifically, the display orientation-related modes for an application may include at least one of a portrait mode or a landscape mode as shown in FIG. 10.

According to an embodiment, the execution screen of an application may have different aspect ratios in the portrait mode and landscape mode.

Figure 11A:
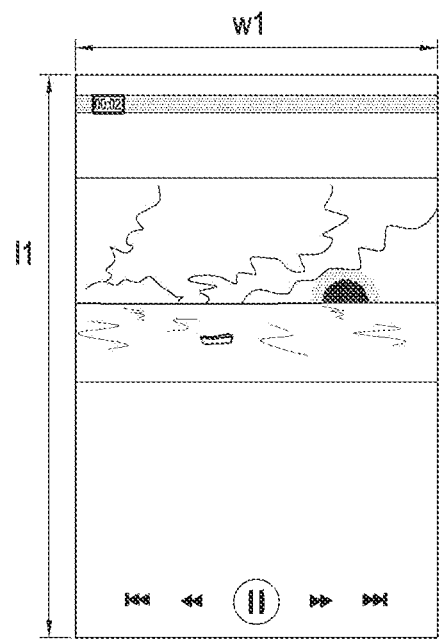

Referring to FIG. 11A, the execution screen of an application running based on the portrait mode may have a first vertical length 11 and a first horizontal length w1 shorter than the first vertical length 11.

Figure 11B:
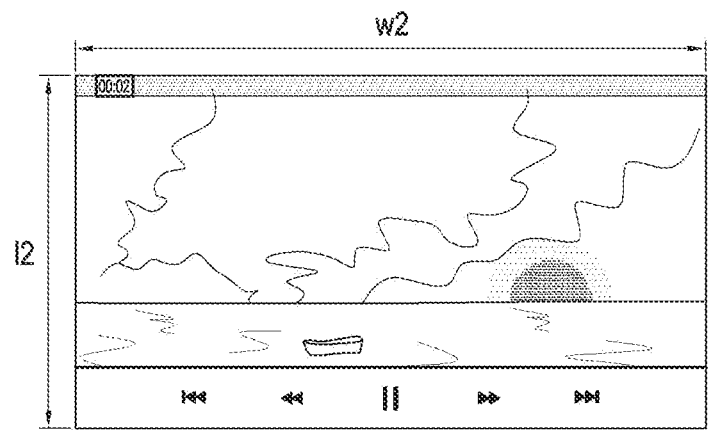

Referring to FIG. 11B, the execution screen of an application running based on the landscape mode may have a second vertical length 12 and a second horizontal length w2 longer than the second vertical length 12. For example, the aspect ratio of the execution screen of an application running based on the landscape mode may be 16:9. However, the horizontal length and vertical length of the execution screen of an application running based on the landscape mode are not limited thereto but may instead be determined to be other various lengths.

Now described is an example in which the electronic device 101 is positioned in portrait orientation for illustration purposes. Thus, when the electronic device 101 is positioned in landscape orientation, the landscape mode and portrait mode in the following description may be replaced with the portrait mode and landscape mode, respectively.

According to an embodiment, the above-described execution state-related modes and display orientation-related modes may be associated with each other. For example, the execution state-related modes and the display orientation-related modes may be integrated single mode.

According to an embodiment, when an execution state-related mode is determined for an application, a display orientation-related mode for the application may be determined corresponding to the determination of the execution state-related mode.

For example, when the resource allocation-related application mode for a particular application is set to the extended running mode, the display orientation-related mode may be determined as the landscape mode or extended mode. In other words, when the particular application runs based on the extended running mode, the execution screen of the particular application may be displayed in the landscape mode or extended mode.

According to an embodiment, when the display orientation-related mode is determined, an execution state-related mode for the application may be determined corresponding to the determination of the display orientation-related mode.

According to an embodiment, the execution state-related mode and display orientation-related mode associated with each other may be reset by a predetermined control operation or method. In other words, as the execution state-related mode is determined, the display orientation-related mode is determined, and as the display orientation-related mode is determined, the execution state-related mode is determined, and the execution state-related mode may be later reset by a predetermined control operation or method.

For example, the first application run based on the extended running mode may be executed based on the foreground running mode corresponding to a touch on the execution screen 1401 of the first application. According to an embodiment, the electronic device 101 in the closed state may display the execution screen 1401 of the first application in a first mode (e.g., the portrait mode) which is any one of the plurality of modes described above. The electronic device 101 may detect a transition to the open state, and corresponding to the state transition, display the execution screen 1903 of the second application a second mode (e.g., the landscape mode) which is another one among the plurality of modes. Various examples of mode transition are described below in detail.

The physical configuration of the electronic device 101 and applications run on the electronic device 101 have been described above.

Various example methods for operating the electronic device 101 are described below.

According to an embodiment, operations of the electronic device 101 may include, for example, and without limitation, display pull-in/out operations and application execution screen display operations.

According to an embodiment, the method for operating the electronic device 101 may be for the processor 120 of the electronic device 101 to control each component of the electronic device 101 to perform the operation of the electronic device 101 based on operations set in the processor 120. The method may be for the processor 120 to control each component of the electronic device 101 to perform the operation of the electronic device 101 as instructions stored in the memory 130 are executed. An example in which the processor 120 of the electronic device 101 controls each component of the electronic device 101 to perform the operation of the electronic device 101 based on operations set in the processor 120 is described for illustration purposes. Thus, the operation of the electronic device 101 described below may be interpreted as controlled by the processor 120 unless specifically mentioned otherwise.

Example operation of the electronic device 101 is described below in greater detail.

The display pull-in/out operation of the electronic device 101 is described.

According to an embodiment, the display pull-in/out operation may be referred to as the display 312 of the electronic device 101 that is pulled out to allow the electronic device 101 to transition from the closed state to the open state or that is pulled (or pushed) to allow the electronic device 101 to transition from the open state to the closed state. The operation of the display 312 that is pulled out in one direction may be referred to as a display pull-out operation, and the operation of the display 312 that is pulled in one direction may be referred to as a display pull-in operation. In other words, the display pull-in/out operation may encompass the display pull-in operation and the display pull-out operation.

According to an embodiment, the display pull-in/out operation ay be triggered by a request to pull in or output the display 312. The request, to pull in or out the display 312 may encompass a request to pull out the display 312 and a request to pull in the display 312. The display 312 pull-in/out request may be triggered by a message received by the user or from the outside or predetermined power or a signal generated in the electronic device 101. The display 312 pull-in/out request is described below in greater detail along with the operation of detecting a pull-in/out of the display 312. The display 312 may be pulled in or out by the user's input.

According to an embodiment, when the electronic device 101 is in the open state as viewed in a direction perpendicular to the first plate, the display 312 pull-out operation may be an operation to move the top end 802 of the display 312 away from the first side wall 3211 of the second plate 321. The display 312 pull-out operation may be triggered as the roller rotates in one direction. For example, when the roller rotates clockwise, the top end 802 of the display 312 may move away from the first side wall 3211 of the second plate 321. The display 312 pull-out operation may be triggered as the multi-bar structure slides in one direction. For example, the display 312 pull-out operation may be to move the top end 802 of the display 312 towards the first outer wall 801 as the multi-bar structure is slid towards the first outer wall 801 as the roller rotates counterclockwise. As the display 312 is pulled out, the first region 901 of the display 312 move away from the first side wall 3211, and the second region 902, hidden by the first plate 311 of the display 312 may be exposed.

According to an embodiment, when the electronic device 101 is in the closed state as viewed in a direction perpendicular to the first plate 311, the display pull-in operation may be an operation to move the top end 802 of the display 312 towards the first side wall 3211 of the second plate 321. The display 312 pull-in operation may be triggered as the roller rotates in one direction. For example, when the roller rotates counterclockwise, the top end 802 of the display 312 may move towards the first side wall 3211 of the second plate 321. The display 312 pull-in operation may be triggered as the multi-bar structure slides in one direction. For example, the display 312 pull-in operation may be to move the top end 802 of the display 312 towards the first side wall 3211 as the multi-bar structure is slid towards the first side wall 3211 as the roller rotates clockwise. As the display 312 is pulled in, the first region 901 of the display 312 is moved towards the first side wall 3211, and the second region 311 may be hidden by the first plate 311.

According to an embodiment, the display pull-in/out operation may trigger the operation of displaying the execution screen of an application, in other words, a pull-in/out of the display 312 of the electronic device 101 may initiate the application execution screen display operation. This is described below along with the execution screen display operation on the electronic device 101.

An example application execution screen display operation on the electronic device 101 is described below.

Figure 12:
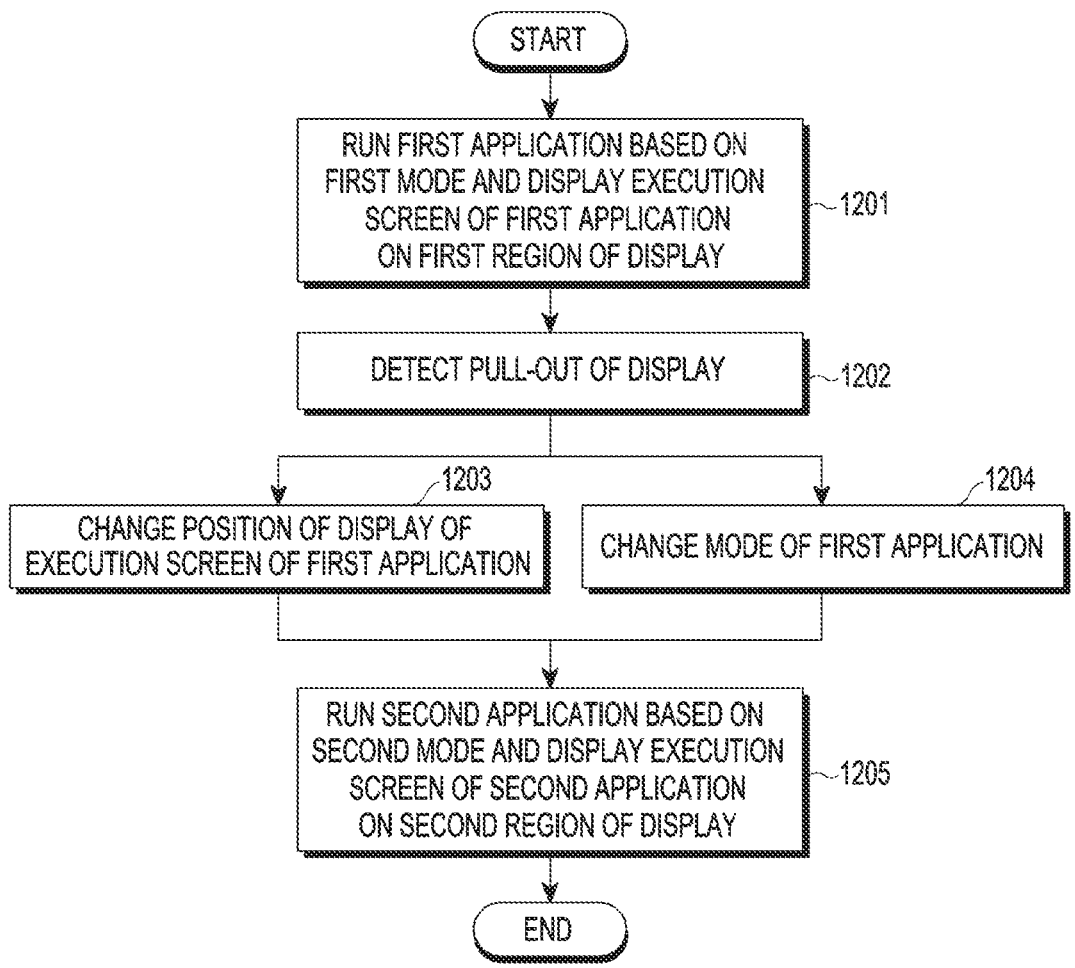
FIG. 12 is a flowchart illustrating an example operation of displaying an execution screen of an application of an electronic device according to an embodiment.

FIG. 12 is a flowchart illustrating an example operation of displaying an execution screen of an application of an electronic device 101 according to an embodiment. The embodiment of FIG. 12 is described below in greater detail with reference to the drawings.

According to an embodiment, the application execution screen display operation may be an operation for detecting a pull-out of the display 312 and displaying the execution screen which used to be displayed on the first region 901 on the portion 903 of the first region 901.

Referring to FIG. 2, the application execution screen display operation may include operations 1201, 1202, 1203, 1204 and 1205. The application execution screen display operation is not limited as including operations 1201, 1202, 1203, 1204 and 1205 but may instead include more or fewer operations. The above-described operations are not limited as performed in the order described above, but an operation described above as performed earlier than another may be performed later than the other operation or vice versa.

The operations are described below in greater detail.

Figure 13:
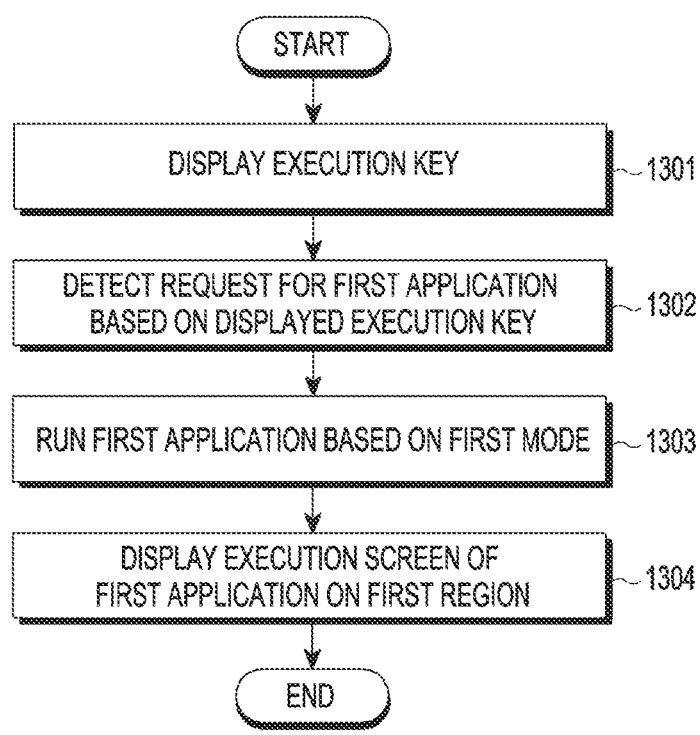
FIG. 13 is a flowchart illustrating an example operation of displaying an execution screen of a first application on a first region according to an embodiment.

FIG. 13 is a flowchart illustrating an example of displaying an execution screen 1401 of a first application on a first region 901 according to an embodiment.

Figure 14:
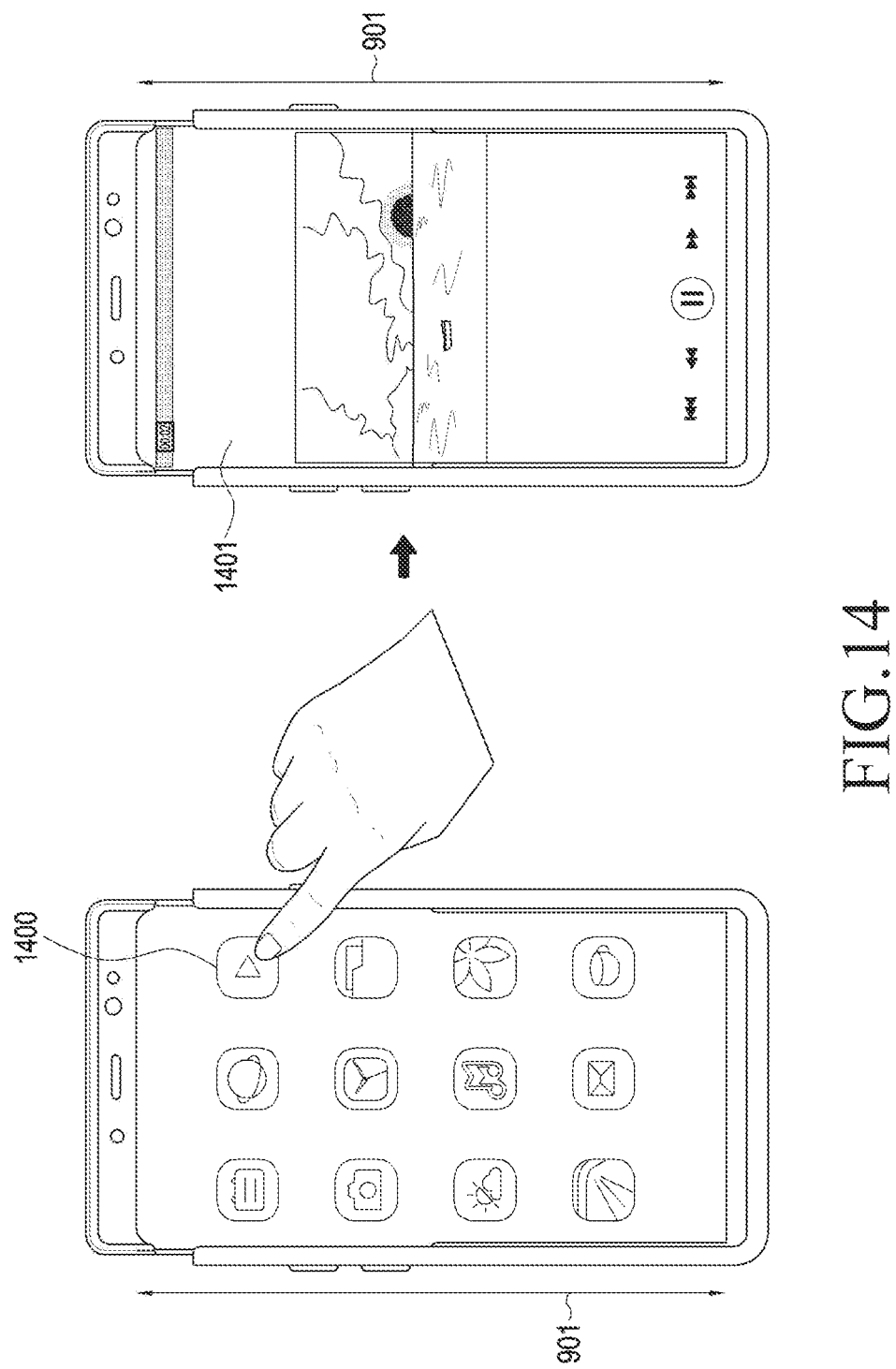
FIG. 14 is a diagram illustrating a first execution key and a first application displayed on a first region according to an embodiment.

FIG. 14 is a diagram illustrating a first execution key 1400 and a first application displayed on a first region 901 according to an embodiment.

Referring to FIGS. 12, 13 and 14, according to an embodiment, the electronic device 101 may display the execution screen 1401 of the first application on the first region 901 of the display 312 based on the first mode in operation 1201.

Referring to FIG. 13, according to an embodiment, the electronic device 101 relay display execution keys (1301), detect a request for the first application corresponding to at least one of the displayed execution keys (1302), display the execution screen 1401 of the first application based on the first mode (1303), and display the execution screen 1401 of the first application on the first region 901 (1304). Without being limited to operations 1301, 1302, 1303 and 1304, operation 1201 may include more or fewer operations. The above-described operations are not limited as performed in the order described above, but an operation described above as performed earlier than another may be performed later than the other operation or vice versa.

Operations 1301, 1302, 1303 and 1304 are described below in greater detail.

In operation 1301, according to an embodiment, the electronic device 101 may display execution keys interworking with applications on the display 312. Interworking with applications may denote that a particular application corresponds to a particular execution key. When the user selects an execution key, the application associated with the execution key may run. For example, the electronic device 101 may display a first execution key 1400 interworking with the first application on the display 312.

In operation 1302, according to an embodiment, the electronic device 101 may detect the user's request for the first execution key 1400 displayed. For example, detecting the user's request may be detecting the user's touch on the first execution key 1400 as shown in FIG. 14.

In operation 1303, according to an embodiment, the electronic device 101 may run the first application in the first mode, corresponding to detecting the user's request. The electronic device 101 runs an application based on the first mode' may be running the application based on the foreground running mode 1001 or displaying the application execution screen in the portrait mode. In other words, the first mode may be at least one of the foreground running mode 1001 or the portrait mode.

In operation 1304, according to an embodiment, the electronic device 101 may, display the execution screen 1401 of the first application on the first region 901. The execution screen 1401 of the first application displayed on the first region 901 may be displayed based on the portrait mode. As shown in FIG. 14, the horizontal length of the execution screen 1401 of the first application displayed on the first region 901 may be shorter than the vertical length.

Operation 1202 is described in greater detail below.

Figure 15:
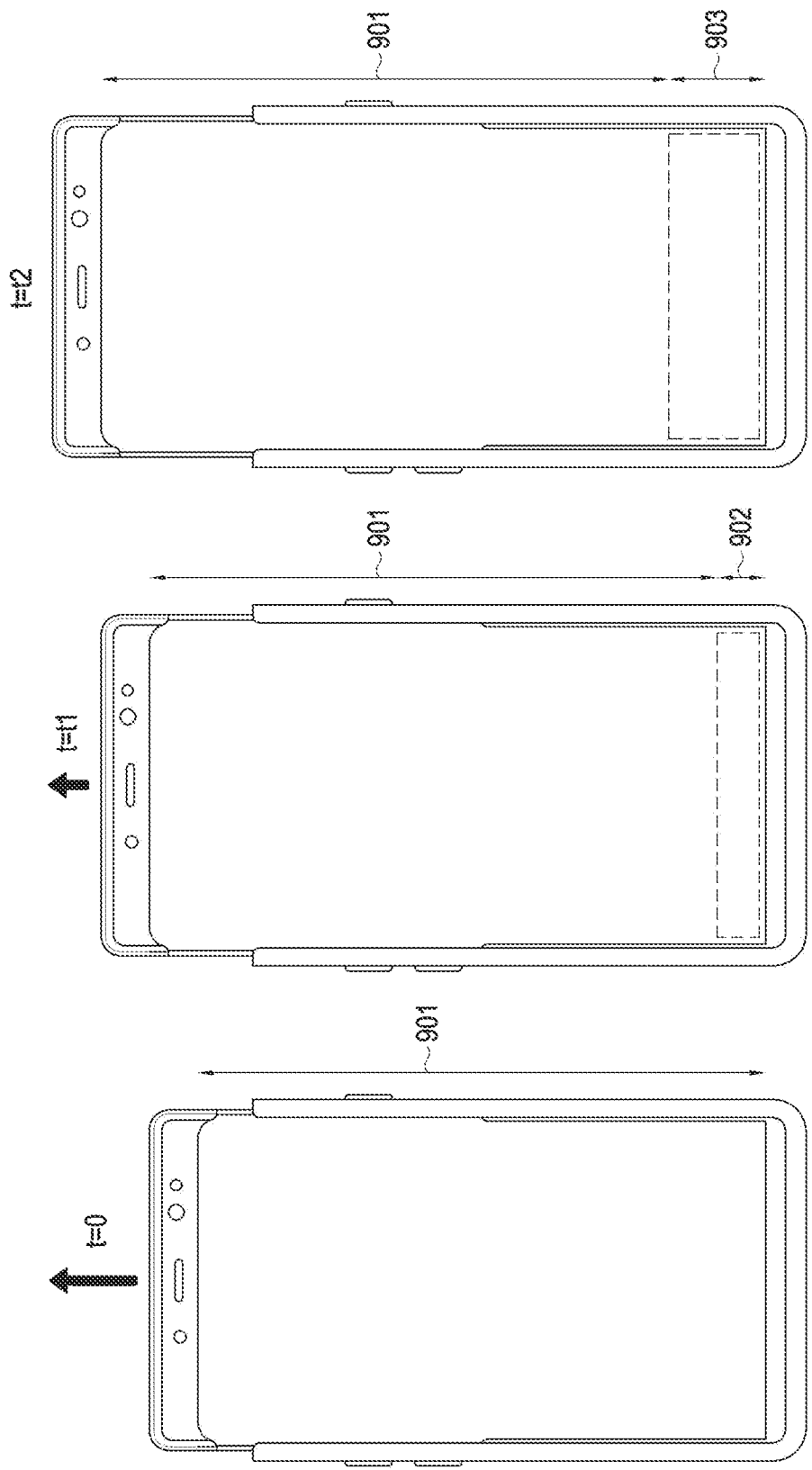
FIG. 15 is a diagram illustrating a time of detecting a pull-out of a display according to an embodiment.

FIG. 15 is a diagram illustrating an example of a time of detecting a pull-out of a display according to an embodiment.

Referring to FIG. 15, according to an embodiment, the electronic device 101 may detect a pull-out of the display 312 in operation 1202. In other words, the electronic device 101 may detect the display (312) pull-out operation. The detection may be performed by the sensor unit of the electronic device 101.

The operation of detecting a pull-out of the display 312 is described below in greater detail.

According to an embodiment, detecting a pull-out of the display 312 may be that the electronic device 101 detects at least one of a request for pulling out the display 312, a generation or application of power or a signal related to the pull-out of the display 312, the rotation of the roller, or the sliding of the multi-bar structure.

For example, according to an embodiment, the display 312 pull-out request may be the user's request related to a pull-out of the display 312. The user's request may refer, for example, to the user's touch or press on a physical or electronic component in the electronic device 101 to start to pull out the display 312. The user's request may refer, for example, to the user's touch or press on a physical or electronic component in the electronic device 101 to terminate to pull out the display 312. For example, the physical component may be a key provided in the electronic device 101, and the electronic component may be a virtual key displayed on the touchscreen or display 312.

According to an embodiment, the power or signal related to a pull-out of the display 312 may be power or a signal to rotate the roller. As a specific example, the power or signal may be power or a signal to drive the motor to rotate the roller while interworking with the roller, or the power or signal related to the pull-out of the display 312 may be power or a signal to stop the roller from rotating.

Referring to FIG. 15, according to an embodiment, detecting a pull-out of the display 312 may be performed at various times. According to an embodiment, the times may include a time (t=0) when the pull-out of the display 312 starts, a time (t=t1) when the pull-out of the display 312 is in progress, and a time (t=t2) when the pull-out of the display 312 is complete. The time (t=0) when the pull-out of the display 312 starts may be a time before the pull-out of the display 312 starts.

According to an embodiment, at the time (t=0) when the pull-out of the display 312 starts, the electronic device 101 may detect the pull-out of the display 312 as shown in FIG. 15. As a specific example, the electronic device 101 may, at the time (t=0), detect a request for pulling out the display 312. At the time (t=0), the electronic device 101 may detect the user's request for pulling out the display 312. At the time (t=0), the electronic device 101 may detect a generating or applying of power or a signal related to the pull-out of the display 312, the roller's start to rotate, and the multi-bar structure's start to slide.

As another example, according to an embodiment, the electronic device 101 may detect a pull-out of the display 312 at the time (t=t1) when the pull-out of the display 312 is in progress as shown in FIG. 15. As a specific example, at the time (t=t1) when the pull-out of the electronic device 101 is in progress, the electronic device 101 may detect at least one of a generation or application of power or a signal related to the pull-out of the display 312, the roller's rotation, and the multi-bar structure's slide.

As another example, according to an embodiment, the electronic device 101 may detect a pull-out of the display 312 at the time (t=t2) when the pull-out of the display 312 is complete as shown in FIG. 15. Specifically, at the time (t=t2) when the pull-out of the display 312 is complete, the electronic device 101 may detect at least one of a request related to the pull-out of the display 312, a generation or application of power or a signal related to the pull-out of the display 312, the roller finishing rotation, or the multi-bar structure finishing slide.

The operation of detecting a pull-out of the display may allow for more reliable use of the electronic device. For example, an electronic device may display the execution screen of an application without detecting a pull-out of the display. Although the display of the electronic device is pulled out, the electronic device 101 does not detect the pull-out of the display. Thus, the execution screen of the application may be displayed on a portion of the first region at an indefinite time. In this case, each time the display of the electronic device is pulled out, the execution screen of the application may be displayed on the portion of the first region at a different time. Thus, the user may be not sure about whether the application execution screen is displayed or not. This may deteriorate reliability in use of the electronic device. However, according to an embodiment, the electronic device may display the application execution screen on the portion of the first region at the time of detecting a pull-out of the display, allowing the user to perceive the exact time the application execution screen is displayed and hence enhanced reliability in use of the electronic device.

Referring back to FIG. 12, according to an embodiment, the electronic device 101 (e.g., the processor 120) may perform at least one of operations 1203 and 1204 corresponding to operation 1202. For example, operations 1203 and 1204 may be performed corresponding to detecting a pull-out of the display 312. In other words, when the display pull-out operation is performed, at least one of operation 1203 or 1204 may be performed corresponding to the display pull-out operation. The pull-out of the display 312 may trigger at least one of operation 1203 and/or operation 1204.

As operations 1203 and 1204 are performed corresponding to detecting a pull-out of the display 312, the application may be quickly put to use. Requiring the user to change the position where the application execution screen is to be displayed and the application mode corresponding to a pull-out of the display may hamper reliable use of the application. However, according to an embodiment, the electronic device 101 may change the position of display of the application execution screen and the application mode corresponding to detecting a pull-out of the display, allowing for quick use of the application.

According to an embodiment, operations 1203 and 1204 may be performed simultaneously or sequentially. When operations 1203 and 1204 are sequentially performed, operation 1203 may be performed earlier than operation 1204. Alternatively, operation 1204 may be performed earlier than operation 1203.

Each operation is described below in further detail.

In operation 1203, according to an embodiment, the electronic device 101 may change the position where the execution screen 1401 of the first application is displayed. As a specific example, in response to detecting a pull-out of the display, the electronic device 101 may display the execution screen 1401 of the first application which used to be displayed on the first region 901 on the portion 903 of the first region 901. Specifically, upon detecting a pull-out of the display 312, the electronic device 101 may display the execution screen 1401 of the first application which used to be displayed on the first region 901 on the portion 903 of the first region 901.

According to an embodiment, the electronic device 101 may make a determination on the portion 903 of the first region 901. According to an embodiment, the portion 903 of the first region 901 may be a preset region.

According to an embodiment, the portion 903 of the first region 901 may be referred to as a region corresponding to the region exposed as the display 312 is pulled out when the electronic device 101 is in the open state. In other words, the portion 903 of the first region 901 may be a region of the first region 901, corresponding to the second region 902.

The portion 903 of the first region 901 may be a region of the first region 901, which is positioned adjacent to the first outer wall 801 of the first plate 311. The portion 903 of the first region 901 may include the top end 802 of the display 312.

The portion 903 of the first region 901 may be a region with an area corresponding to the area of the second region 902. In other words, the area of the first region 901 may correspond to the area in which the display 312 is exposed to the first outer wall 801, with the electronic device 101 being in the open state. The portion 903 of the first region 901 may be a region larger in area than the second region 902. In other words, the area of the portion 903 of the first region 901 may be larger than the area of the display 312 pulled out when the electronic device 101 is in the open state.

According to an embodiment, the time when the electronic device 101 displays the application execution screen on the portion 903 of the first region 901 may be the time of detecting a pull-out of the display 312. Specifically, the electronic device 101 may display the application execution screen on the portion 903 of the first region 901 at, at least one, of the time (t=0) when the pull-out of the display 312 starts, the time (t=t1) when the pull-out of the display 312 is in progress, and the time (t=t2) when the pull-out of the display 312 is complete.

The time when the electronic device 101 displays the application execution screen on the portion 903 of the first region 901 may be a time after the time of detecting a pull-out of the display 312. For example, when detecting a pull-out of the display 312, the electronic device 101 may wait a preset time and may then display the application execution screen on the portion 903 of the first region 901.

The time when the electronic device 101 displays the application execution screen on the portion 903 of the first region 901 may be a preset time. Specifically, the preset time may be at least one of the time (t=0) when the pull-out of the display 312 starts, the time (t=t1) when the pull-out of the display 312 is in progress, and the time t=t2) when the pull-out of the display 312 is complete. In this case, upon detecting a pull-out of the display 312, the application execution screen display operation may be triggered. However, the electronic device 101 may get ready to display the application execution screen on the portion 903 of the first region 901 until the preset time.

Operation 1204 is described in greater detail below.

Figure 16:
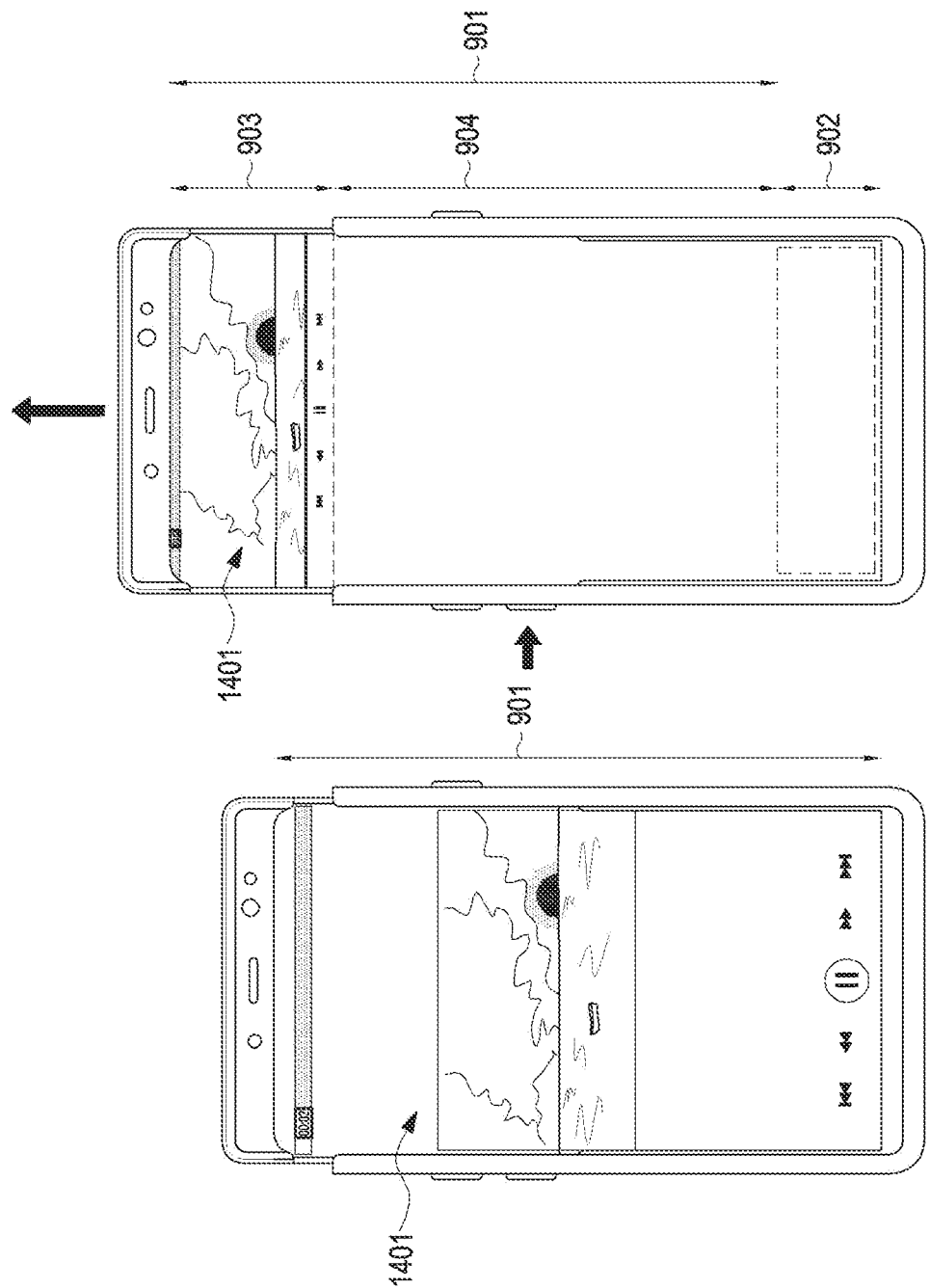
FIG. 16 is a diagram illustrating an example operation for displaying an execution screen of a first application which used to be displayed on a first region on a portion of the first region according to an embodiment.

FIG. 16 is a diagram illustrating an operation for displaying an execution screen 1401 of a first application which used to be displayed on a first region 901 on a portion 903 of the first region according to an embodiment.

Figure 17:
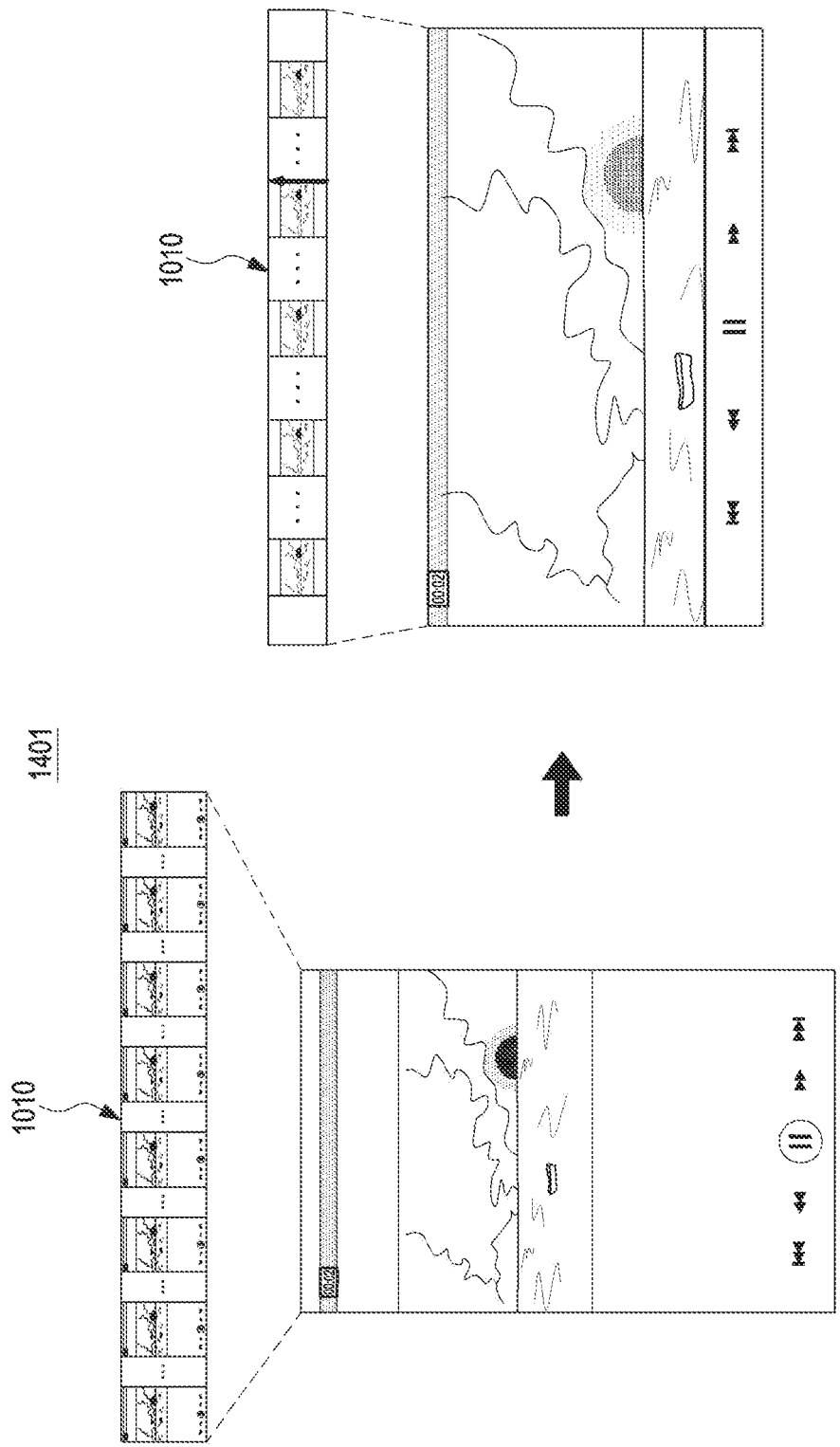
FIG. 17 is a diagram illustrating an example operation for switching modes of a first application according to an embodiment.

FIG. 17 is a view illustrating an operation for switching modes of a first application according to an embodiment.

In operation 1204, according to an embodiment, the electronic device 101 may change the mode of the first application which used to be displayed on the first region 901. In response to detecting a pull-out of the display 312, the electronic device 101 may change at least one of the execution state-related mode or display orientation-related mode for the first application which used to be displayed on the first region 901.

According to an embodiment, the electronic device 101 may display the execution screen 1401 of the first application, which used to be run based on the first mode, based on the second mode. Specifically, upon detecting a pull-out of the display 312, the electronic device 101 may display the execution screen 1401 of the first application based on the second mode or may change the mode of the first application from the first mode to the second mode.

Referring to FIGS. 16 and 17, according to an embodiment, the second mode may be at least one of the extended running mode, the landscape mode, or extended mode. In other words, the electronic device 101 may run the first application based on at least one of the extended running mode, landscape mode, or extended mode.

Referring to FIG. 16, according to an embodiment, the electronic device 101 may switch the execution screen 1401 of the first application which used to be displayed on the portion 903 of the first region 901.

According to an embodiment, when the execution screen 1401 of the first application is displayed on the portion 903 of the first region 901, the first application may be run based on the second mode. According to an embodiment, the second mode may be the landscape mode or extended mode. In other words, the execution screen 1401 of the first application may be displayed on the portion 903 of the first region 901 based on the landscape mode or extended mode. The horizontal length of the execution screen 1401 of the first application run on the portion 903 of the first region 901 may be longer than the vertical length.

According to an embodiment, when the electronic device 101 displays the execution screen 1401 of the first application on the portion 903 of the first region 901, the execution screen 1401 of the first application which used to be displayed on the first region 901 based on the portrait mode may be displayed based on the landscape mode or extended mode.

Referring to FIG. 17, according to an embodiment, the electronic device 101 may switch the mode of the first application from the foreground running mode 1001 to the extended running mode. When the mode of the first application switches from the foreground running mode 1001 to the extended running mode, the first application may keep being displayed on the display 312 of the electronic device 101, but the resource allocation may be varied. A first resource allocation may be assigned to the first application displayed on the first region 901 based on the foreground running mode 1001, and a second resource allocation may be assigned to the first application displayed on the portion 903 of the first region 901 based on the extended running mode. The first resource allocation may be larger than the second resource allocation. In other words, when the mode of the first application switches from the foreground running mode 1001 to the extended running mode, the resource allocation assigned to the first application may decrease. Accordingly, the property value for displaying the screen of the first application with the execution screen displayed on the portion 903 of the first region 901 may be decreased. For example, the frame rate and refresh rate of the execution screen 1401 of the first application may be lowered. Thus, the number of frames 1010 per unit time on the execution screen 1401 of the first application may be reduced. Or, the update cycle of the first application may be prolonged.

Figure 18:
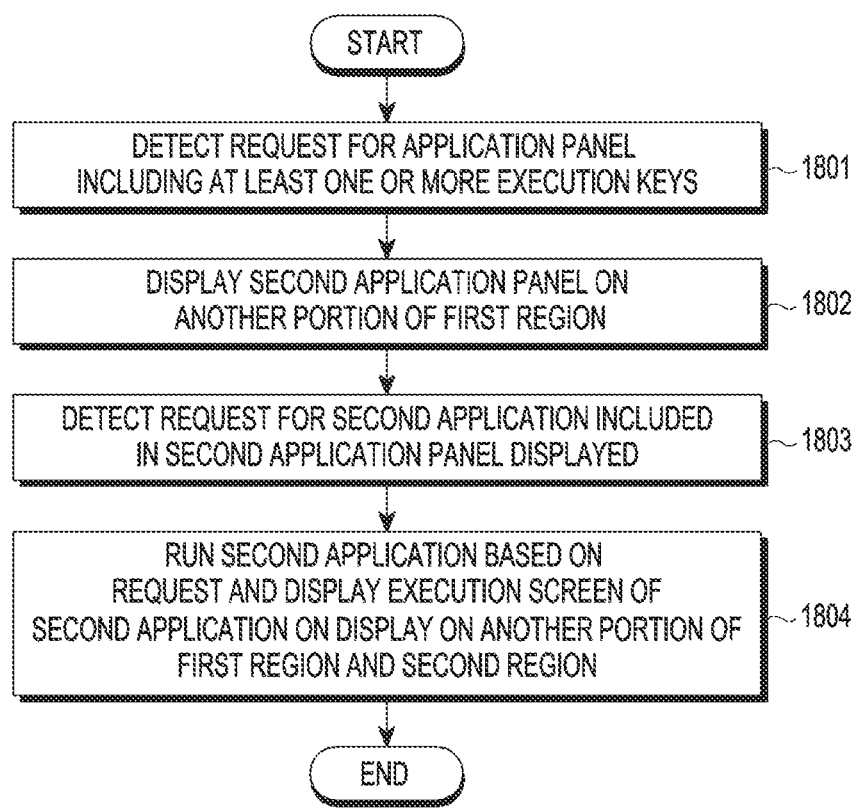
FIG. 18 is a flowchart illustrating an example operation according to an embodiment.
Figure 19:
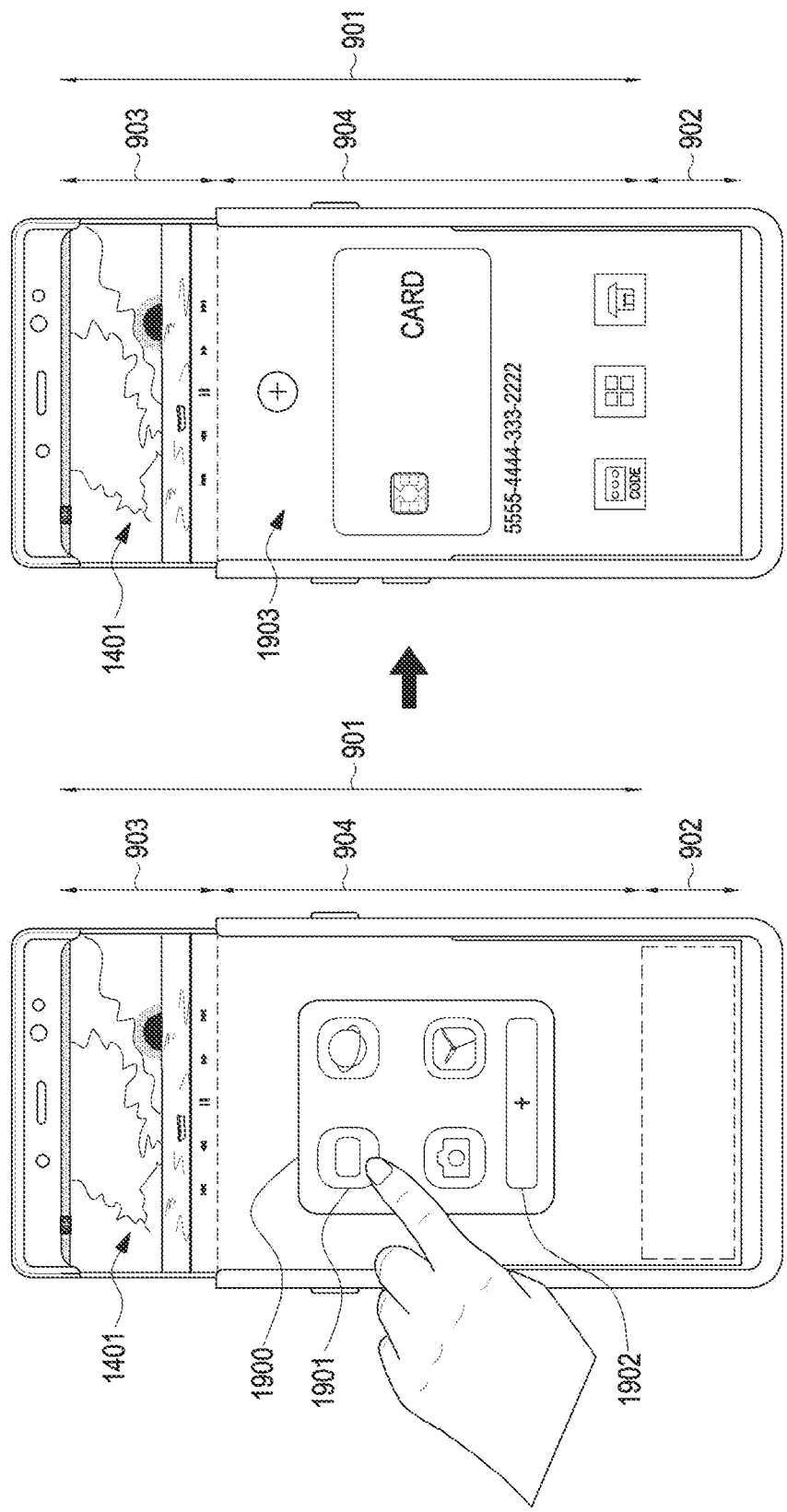
FIG. 19 is a diagram illustrating an example application panel displayed on a display, of an electronic device according to an embodiment.

FIG. 18 is a flowchart illustrating operation 1205 according to an embodiment, FIG. 19 is a diagram illustrating an application panel 1900 displayed on a display 312 of an electronic device 101 according to an embodiment.

Figure 20:
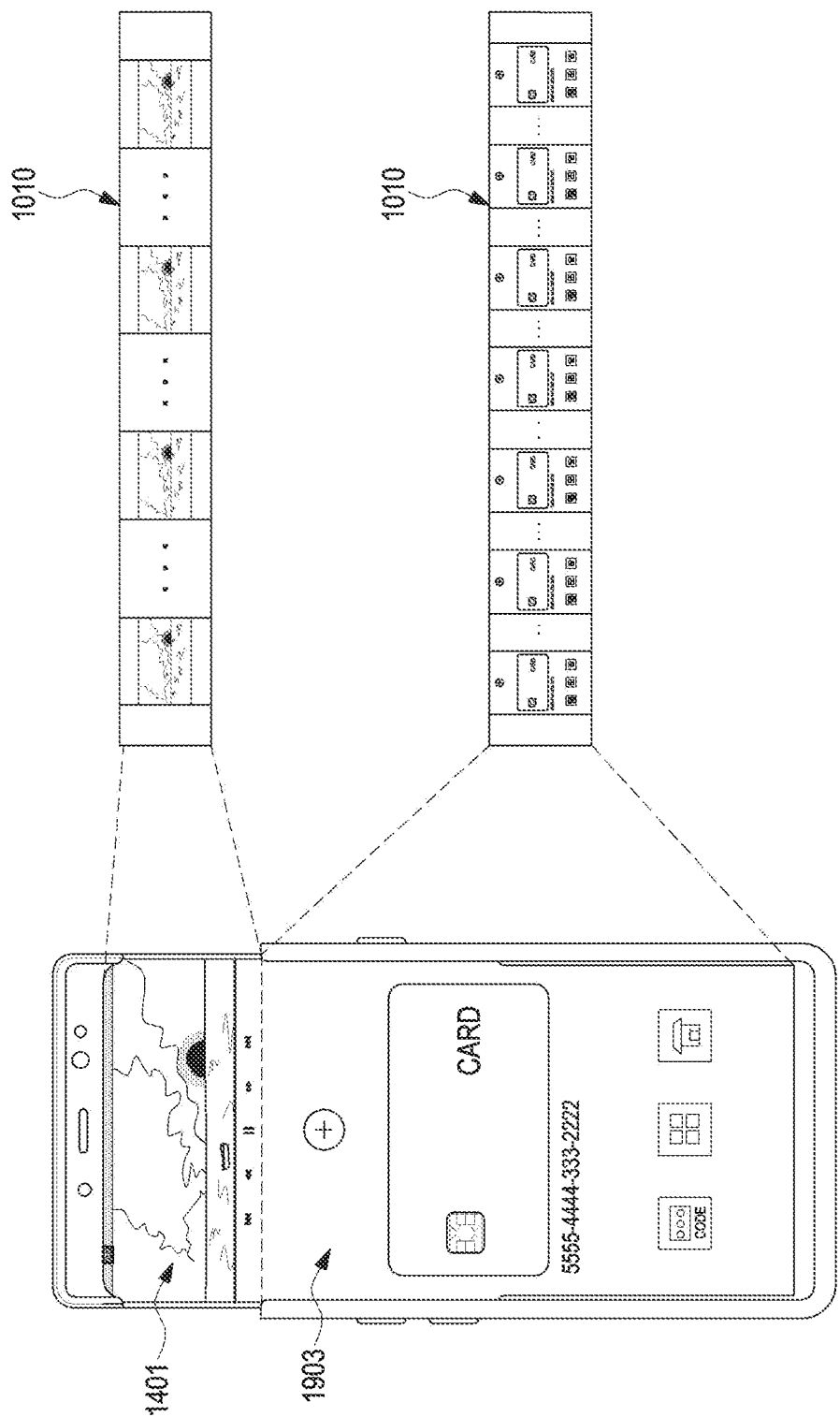
FIG. 20 is a diagram illustrating an example execution screen of a first application displayed on a portion of a first region and an execution screen of a second application displayed on a second region according to an embodiment.

FIG. 20 is a diagram illustrating an execution screen 1401 of a first application displayed on a portion 903 of a first region and an execution screen 1903 of a second application displayed on a second region 902 according to an embodiment.

Referring to FIGS. 18 and 19, according to an embodiment, in operation 1205, the electronic device 101 may display the application panel 1900 for running the second application.

Referring to FIG. 18, in operation 1801, the electronic device 101 (e.g., the processor 120) may detect a request for the application panel 1900 including at least one or more execution keys. Corresponding to the request, the electronic device 101 may display the application panel 1900 on at least one of the other portion 904 of the first region 901 or the second region 902 (1802). The electronic device 101 may detect a request for running the second application through the displayed application panel 1900 (1803). Based on the request, the electronic device 101 may run the second application and display the second application on at least one of the other portion 904 of the first region 901 or the second region 902 (1804). Without being limited to operations 1801 to 1804, operation 1205 may include more or fewer operations. The above-described operations are not limited as performed in the order described above, but an operation described above as performed to earlier than another may be performed later than the other operation or vice versa.

Operations 1801, 1802, 1803 and 1804 are described below in greater detail.

In operation 1801, the electronic device 101 (e.g., the processor 120) may detect a pull-out of the display 312. In operation 1802, the electronic device 101 may display a second application panel on a portion other than the portion of the first region of the display. For example, the electronic device 101 may display the application panel 1900 on the display 312 corresponding to detecting the pull-out of the display 312. In this case, the electronic device 101 may display the execution screen 1401 of the first application on the portion 903 of the first region 901 and then the application panel 1900 on the remaining portion. Without being limited thereto, the electronic device 101 may, however, display the application panel 1900 on the remaining portion and display the execution screen 1401 of the first application on the portion 903 of the first region 901.

According to an embodiment, the electronic device 101 may detect the user's request for the application panel 1900. Detecting the user's request may be at least one of detecting a touch on at least one of the first region 901 and second region 902 of the display 312 and detecting the user's input through a predetermined physical key provided in the electronic device 101.

The electronic device 101 may detect a display of the execution screen 1401 of the first application on the portion 903 of the first region 901 and display the application panel 1900 on the display 312 corresponding to the display of the execution screen 1401 of the first application on the portion 903 of the first region 901.

Referring to FIG. 19, the application panel 1900 displayed may include at least one or more execution keys. The execution keys may include a second execution key 1901 and an edit key 1902. The second execution key 1901 may correspond to the second application. In other words, when the second execution key 1901 is selected, the second application may run. The edit key 1902 may invoke an interface to edit the application panel 1900. The user may edit the execution keys in the application panel 1900 using the edit key 1902. Accordingly, the user may include the second execution key 1901 corresponding to the second application, which the user desires to run along with the first application, in the application panel 1900.

According to an embodiment, the electronic device 101 may provide the second application associated with the first application so that the user may use the second application.

According to an embodiment, a particular application corresponding to the first application may be determined as the second application. In other words, the electronic device 101 may display the second execution key 1901 associated with the first application on the application panel 1900, providing the second execution key 1901 to the user.

The electronic device 101 may determine the second application based on the number of times of running together with the first application. For example, the second application may be a particular application determined by the electronic device 101 to be frequently run along with the first application.

According to an embodiment, the electronic device 101 may grade, and manage in a score, the number of times of running along with the application. The score may be referred to as a pairing score. For example, when a particular application is run often together with the first application, the electronic device 101 may assess the particular application's pairing score high for the first application. In this case, the electronic device 101 may determine that the particular application with a high pairing score is the second application and display the second execution key 1901 corresponding to the particular application on the application panel 1900.

The second application determined to be run along with the first application of the particular application may be determined based on artificial intelligence (AI) technology. For example, the second application may be determined based on machine learning or deep learning on a database for types and number of times of the second application run in association with the first application.

According to an embodiment, the electronic device 101 may use the second application associated with the first application, providing convenience when using applications.

In operation 1803, according to an embodiment, the electronic device 101 may receive the user's input for the second execution key 1901 to run the second application as shown in FIG. 19.

In operation 1804, according to an embodiment, the electronic device 101 may run the second application based on the first mode and display the execution screen 1903 of the second application on the second region 902 and the other portion than the portion 903 of the first region 901 as shown in FIG. 19. Without being limited thereto, the screen of the second application may be displayed on at least one of the second region 902 and the other portion than the portion 903 of the first region 901. The first mode may be at least one of the foreground running mode 1001 or the portrait mode.

According to an embodiment, the electronic device 101 may display the execution screen 1903 of the second application based on the portrait mode. In other words, the horizontal length of the execution screen 1903 of the second application displayed on the second region 902 and the other portion 904 of the first region 901 may be shorter than the vertical length.

According to an embodiment, the electronic device 101 may run the second application based on the foreground running mode 1001. The electronic device 101 may display the execution screen 1903 of the second application based on the foreground running mode 1001.

Referring to FIG. 20, the first application and the second application may have different modes.

As shown in FIG. 20, the execution screen 1401 of the first application may be displayed in the landscape mode or extended mode, and the execution screen 1903 of the second application may be displayed in the portrait mode.

The execution screen 1401 of the first application may have lower screen display property values than the execution screen 1903 of the second application. As a specific example, the execution screen 1401 of the first application may have a lower frame rate and refresh rate than the execution screen 1903 of the second application. In other words, the execution screen 1401 of the first application may be smaller in the number of frames 1010 per unit time than the execution screen 1903 of the second application. The execution screen 1903 of the second application may have a higher frame rate and refresh rate than the execution screen 1401 of the first application. In other words, the execution screen 1903 of the second application may be larger in the number of frames 1010 per unit time than the execution screen 1401 of the first application. The update cycle of the first application may be longer than the update cycle of the second application.

Although the electronic device 101 provides the application panel 1900 and runs the second application in the above description, embodiments of the disclosure are not limited thereto. For example, when the execution screen 1401 of the first application displayed on the portion 903 of the first region 901, the electronic device 101 may automatically run the second application.

According to an embodiment, the second application automatically run by the electronic device 101 may be preset by the user or may be determined based on the number of times of running together with the first application. No repetitive description thereof is presented.

According to an embodiment, the time when the second application is automatically run by the electronic device 101 may be set to various times. For example, the times may include at least one of a time before the execution screen 1401 of the first application is displayed, the time when the execution screen 1401 of the first application is displayed on the first region 901, a time after the execution screen 1401 of the first application is displayed on the first region 901, and the time when a pull-out of the display 312 is detected.

Although the second application uses the application panel 1900 for its execution or is automatically run by the electronic device 101 in the above description, a running of the second application may be triggered by an external factor.

The execution of the second application triggered by the external factor is described in greater detail below.

Figure 21:
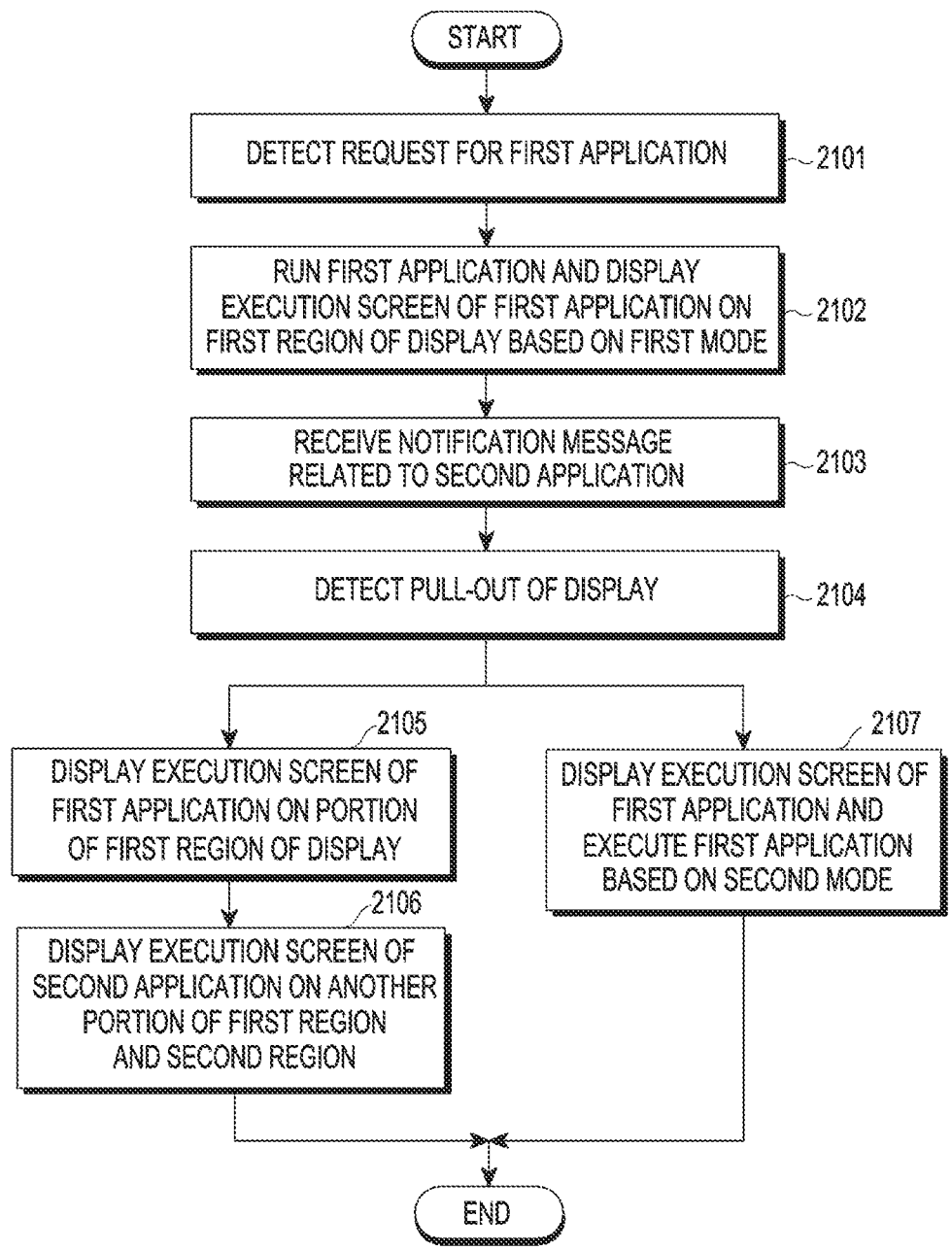
FIG. 21 is a flowchart illustrating an example pull-in or out of a display of an electronic device and a display of an application when a message is received according to an embodiment.

FIG. 21 is a flowchart illustrating an example pull-in or out operation of a display of an electronic device 101 and a display of an application when a message is received according to an embodiment.

Figure 22:
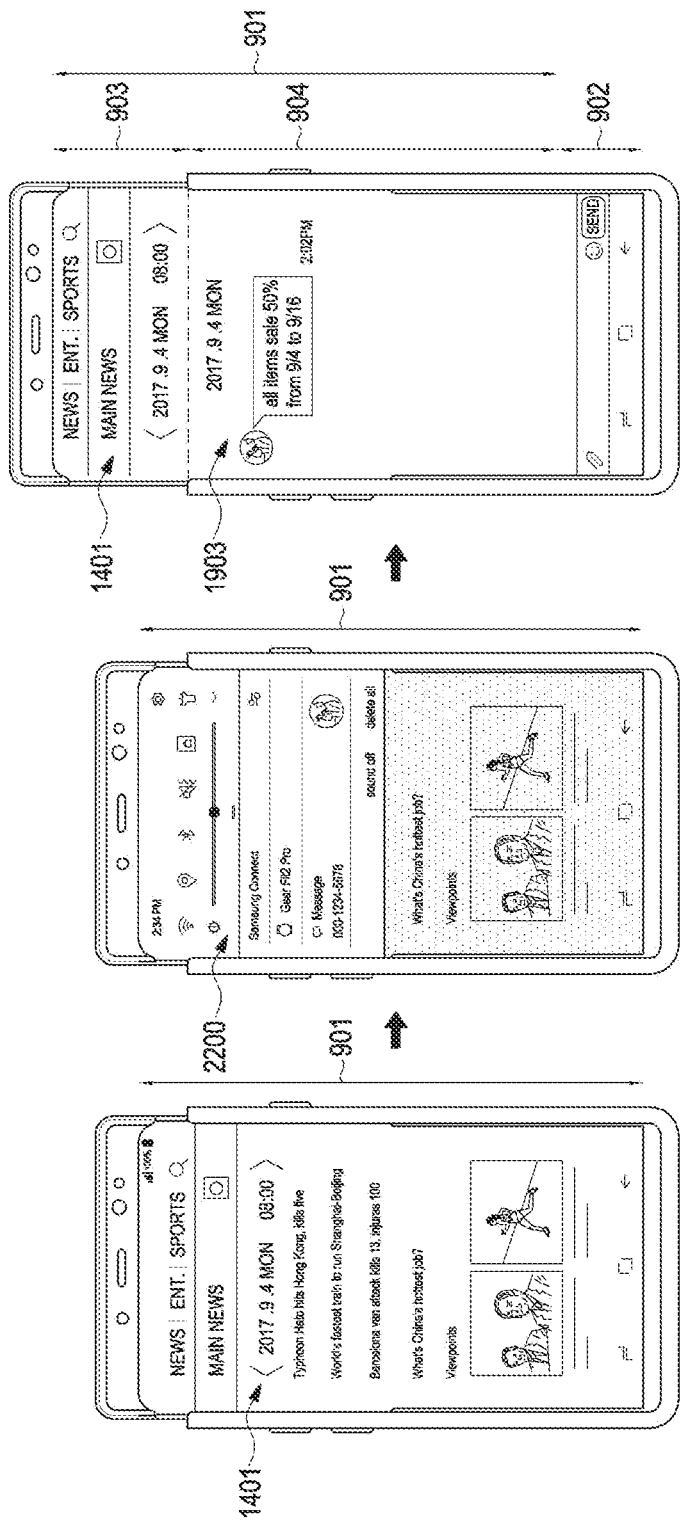
FIG. 22 is a diagram illustrating an example pull-in or out of a display of an electronic device and a display of an application when a message is received according to an embodiment.

FIG. 22 is a diagram illustrating an example pull-in or out operation of a display of an electronic device 101 and a display of an application when a message is received according to an embodiment.

Referring to FIGS. 21 and 22, the external factor may include a message automatically received by the electronic device, such as a push message, a push alarm, or a notification message 2200. For ease of description, an example in which the notification message 2200 is the external factor is described below.

Referring to FIG. 21, according to an embodiment, the electronic device 101 may, detect a request for the first application (2101), run the first application, and display the execution screen 1401 of the first application on the first region 901 (2102). No repetitive description is made of operations 2101 and 2102. The electronic device 101 may receive a notification message 2200 related to the second application (2103) and detect a pull-out of the display 312 (2104). Upon detecting the pull-out of the display 312, the electronic device 101 may display the execution screen 1401 of the first application on the portion 903 of the first region 901 (2105) and display the execution screen 1903 of the second application on the other portion 904 of the first region 901 and the second region 902 (2106), switch the mode of the first application from the first mode to the second mode, and run the first application based on the second mode (2107).

Operations 2105, 2106, and 2107 may be performed simultaneously or sequentially. When the operations are sequentially performed, operations 2105, 2106, and 2107 may be performed m various orders.

The operations are described below in detail with reference to FIG. 22.

No repetitive description is made of operations 2101, 2102, and 2104 to 2107.

In operation 2103, the notification message 2200 related to the second application of the display 312 of the electronic device 101 may be displayed. The notification message 2200 may be displayed on the display 312 of the electronic device 101 in various forms. For example, the notification message 2200 may be displayed on the execution screen 1401 of the first application. The notification message 2200 together with the execution screen 1401 of the first application may be displayed on the display 312 of the electronic device 101. In this case, the execution screen 1401 of the first application may be resized to secure a region to display the notification message 2200. Without being limited to what is described in connection with FIG. 22, the notification message 2200 may not be displayed on the display 312 of the electronic device 101.

In operation 2103, according to an embodiment, the electronic device 101 may run the second application corresponding to the received notification message 2200. At this time, the second application may be run based on the background running mode or paused ground running mode. In other words, although the execution screen 1903 of the second application is not displayed, resources may be allocated to the second application so that the electronic device 101 may perform a predetermined operation related to the second application. Without being limited thereto, the second application may have already run based on the background running mode or paused ground running mode before the notification message 2200 is received or may run after the notification message 2200 is received.

The operation is not limited as performed as per the above-mentioned order but may instead be performed earlier or later. For example, receiving the notification message 2200 (2103) may be performed between detecting a pill-out of the display 312 (2104) and displaying the execution screen 1401 of the first application (2106). In this case, the notification message 2200 may be displayed on at least one of the second region 902 and the other portion 904 of the first region 901. When the notification message 2200 displayed is selected, the execution screen 1903 of the second application related to the notification message 2200 may be displayed on at least one of the other portion 904 of the first region 901 and the second region 902. Alternatively, without displaying the notification message 2200, the execution screen 1903 of the second application related to the notification message 2200 may immediately be displayed on at least one of the other portion 904 of the first region 901 and the second region 902. In this case, a predetermined interface to ask the user whether to run the second application may be further displayed on the display 312.

Although the second application is associated with the first application in the above description, embodiments of the disclosure are not limited. For example, the second application may be an application not associated with the first application.

Described in greater detail below is the operation of displaying an execution screen of an application triggered by a pull-in of the display 312 of the electronic device 101.

Figure 23:
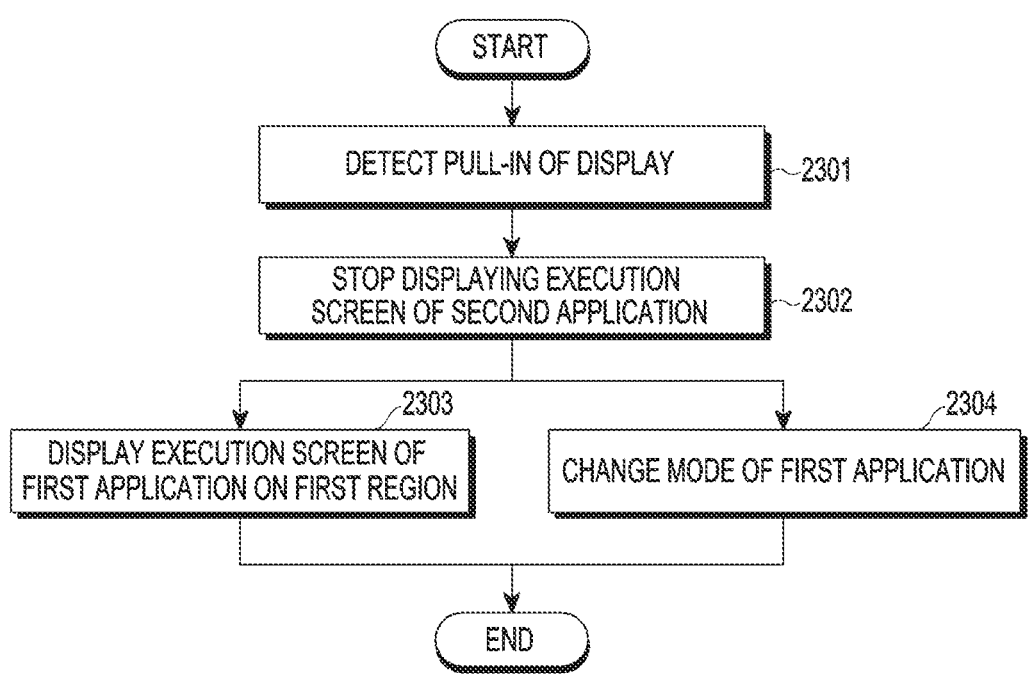
FIG. 23 is a flowchart illustrating an example display of an execution screen of an application triggered by a pull-in of a display according to an embodiment.

FIG. 23 is a flowchart illustrating an example display of an execution screen of an application triggered by a pull-in of a display 312 according to an embodiment.

Figure 24:
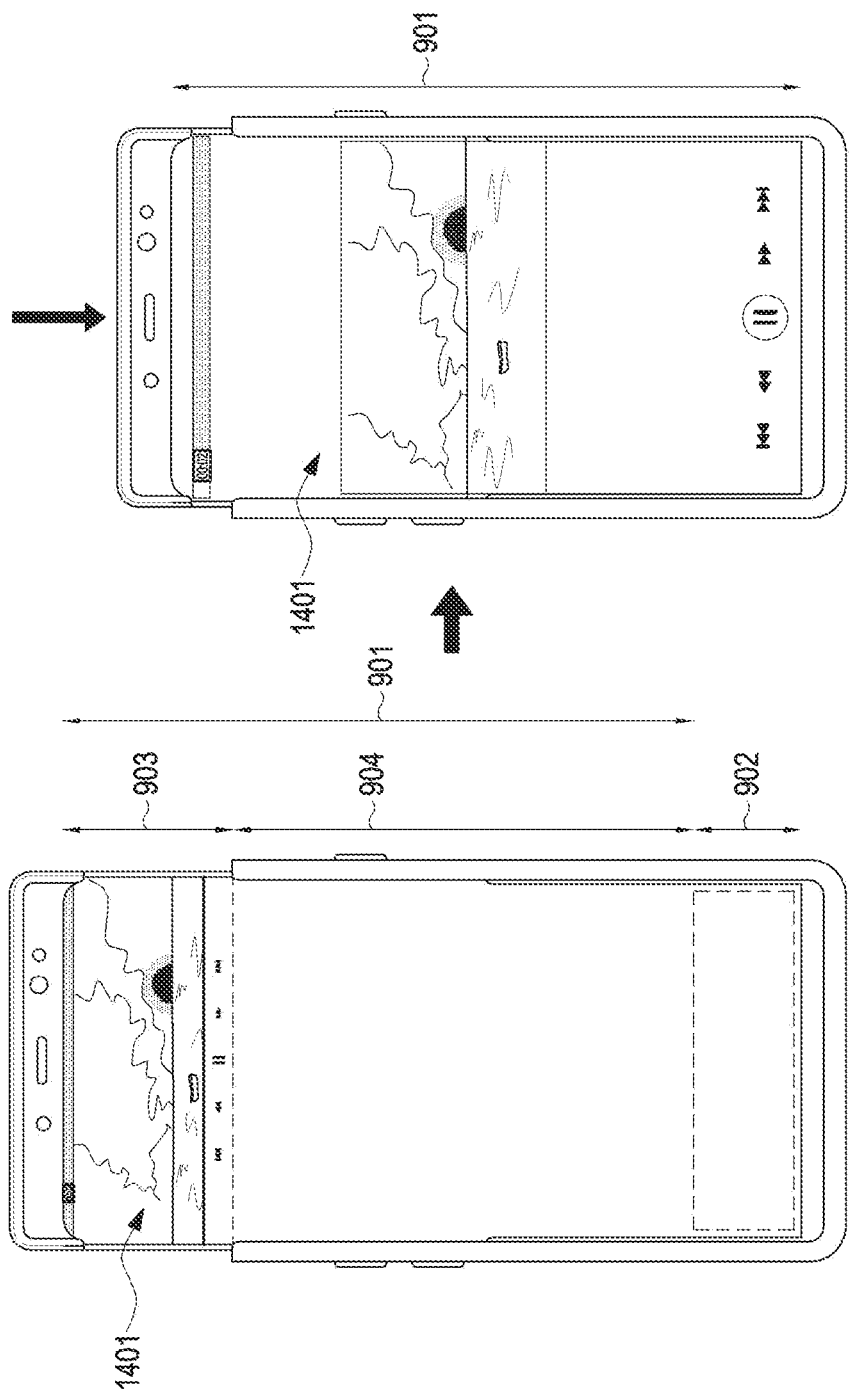
FIG. 24 is a diagram illustrating an example display of an execution screen of an application triggered by a pull-in of a display according to an embodiment.

FIG. 24 is a diagram illustrating an example display of an execution screen of an application triggered by a pull-in of a display 312 according to an embodiment.

Referring to FIGS. 23 and 24, according to an embodiment, the electronic device 101 may detect a pull-in of the display 312 (2301), stop displaying the execution screen 1903 of the second application corresponding to the detection (2302), display the execution screen 1401 of the first application on the first region 901 (2303), and switch (change) the mode of the first application (2304).

In operation 2301, according to an embodiment, the electronic device 101 detecting a pull-in of the display 312, like detecting a pull-out of the display 312 as described above, may be that the electronic device 101 detects at least one of a request for pulling in the display 312, a generation or application of power or a signal related to the pull-in of the display 312, the rotation of the roller, and the sliding of the multi-bar structure. Thus, no repetitive description is made in relation to detecting a pull-in of the display 312.

According to an embodiment, detecting a pull-in of the display 312 may be performed at various times like detecting a pull-out of the display 312 as described above. According to an embodiment, the times when a pull-in is detected may include a time (t=0) when the pull-in of the display 312 starts, a time (t=t1) when the pull-in of the display 312 is in progress, and a time (t=t2) when the pull-in of the display 312 is complete. Thus, no repetitive description is made in relation to the time of detecting a pull-in of the display 312.

In operation 2302, according to an embodiment, the electronic device 101 may change the mode of the second application. Specifically, the electronic device 101 may switch the resource allocation-related mode of the second application from the foreground running mode 1001 to the background running mode or paused ground running mode. For example, the execution screen of the second application is not displayed on the display 312 but may continue running. Without being limited thereto, the electronic device 101 may terminate the second application.

In operation 2303, according to an embodiment, the electronic device 101 may display the execution screen 1401 of the first application on the first region 901 corresponding to detecting the pull-in of the display 312.

In operation 2304, according to an embodiment, the electronic device 101 may switch (change) the execution state-related mode and display orientation-related mode of the first application corresponding to detecting the pull-in of the display 312. Specifically, the electronic device 101 may switch the mode of the first application from the extended running mode to the foreground running mode 1001 and run the first application based on the foreground running mode 1001. In other words, the resource allocation to the first application may increase corresponding to the pull-in of the display 312. The electronic device 101 may run the first application which used to run based on the landscape mode or extended mode based on the portrait mode. Thus, the horizontal length of the execution screen 1401 of the first application may be longer than the vertical length.

The execution state-related modes of the first application are described below in greater detail.

Figure 25:
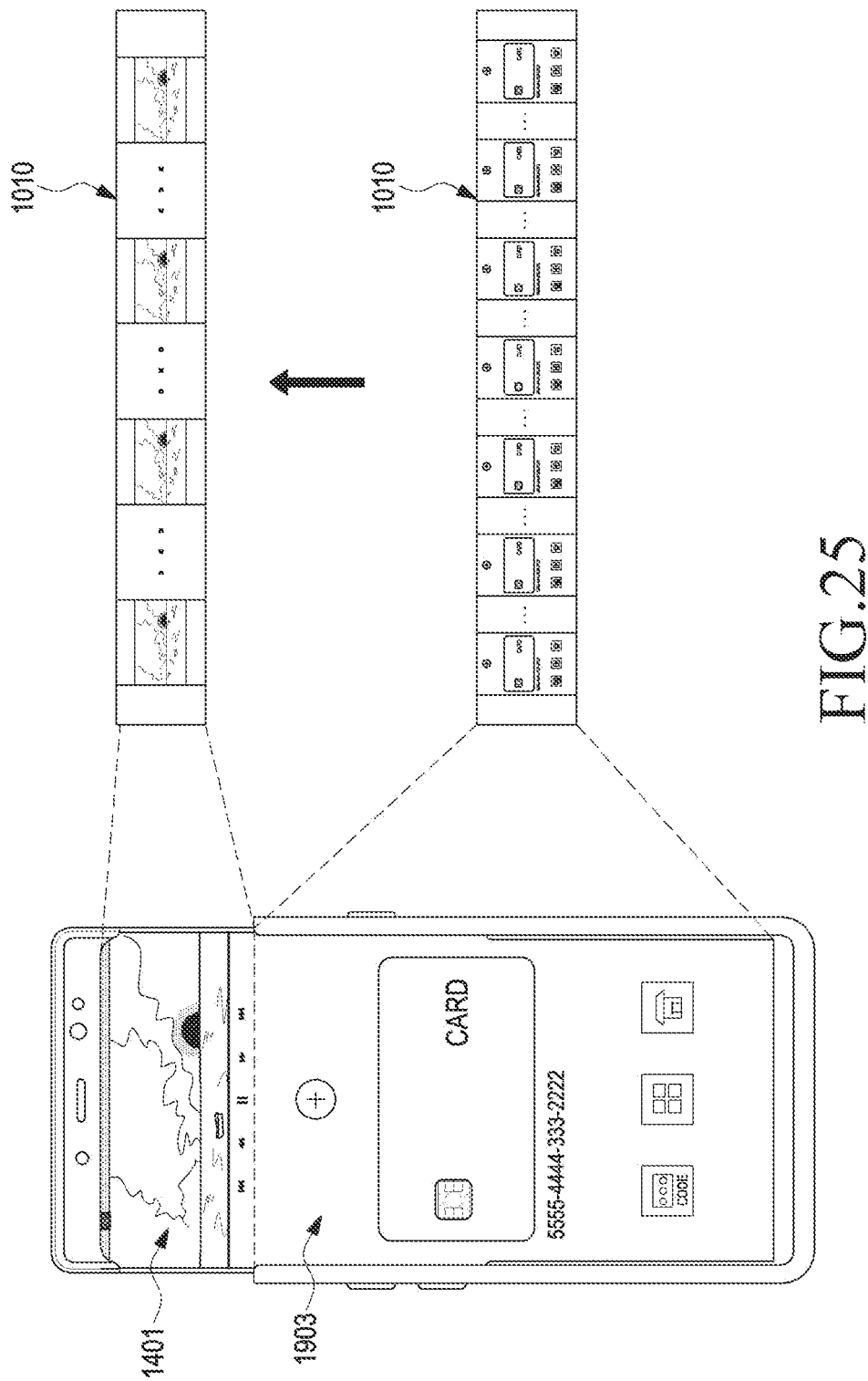
FIG. 25 is a diagram illustrating an example mode regarding an execution state of a first application displayed on a portion of a first region.

FIG. 25 is a diagram illustrating an example mode regarding an execution state of a first application displayed on a portion 903 of a first region.

According to an embodiment, the electronic device 101 may determine a mode for the first application based on application-related information about the first application or application-related information about the second application.

For example, referring to FIG. 25, the electronic device 101 may determine an execution state-related mode of the first application based on the first application-related information. For example, the electronic device 101 may calculate resource allocation to be assigned to the first application based on the first application-related information. As a specific example, the electronic device 101 may calculate the resource allocation to be assigned to the first application based on the application key of the first application. In this case, as an example, the electronic device 101 may calculate the resource allocation based on the application key using a predetermined look-up table containing resource allocations to be assigned to applications per application key. In this case, the electronic device 101 may compare the calculated resource allocation with a reference resource allocation, determining the mode of the first application. For example, when the calculated resource allocation is smaller than the reference resource allocation, the electronic device 101 may determine that the mode of the first application is the extended background running mode 1004, or when the calculated resource allocation is larger than the reference resource allocation, the electronic device 101 may determine that the mode of the first application is the extended foreground running mode 1003. As a specific example, when the first application is an image application, the electronic device 101 may determine that the mode of the first application is the extended background running mode 1004.

According to an embodiment, the electronic device 101 may compare application-related information about the first application with the predetermined look-up table or predetermined reference information stored in the electronic device 101, determining the execution state-related mode of the first application. For example, when the application-related information about the first application corresponds to the extended foreground running mode, the electronic device 101 may run the first application based on the extended foreground running mode, or when the application-related information about the first application corresponds to the extended background running mode, the electronic device 101 may run the first application based on the extended background running mode.

The electronic device 101 may determine the execution state-related mode of the first application at various times. The various times may include at least one of the time when a request for running the first application is received and the time when the first application is running.

For example, referring to FIG. 25, the electronic device 101 may determine the execution state-related mode of the first application based on the application-related information about the second application. For example, the electronic device 101 may calculate resource allocation to the second application based on the second application-related information and determine the execution state-related mode of the first application. No repetitive description is made in relation to calculating the resource allocation.

As a specific example, the electronic device 101 may compare the resource allocation to the second application with the resource allocation to the first application, determining the mode of the first application. In this case, the electronic device 101 may calculate the resource allocation to the first application as described above. When the resource allocation to the second application is larger than the resource allocation to the first application, the electronic device 101 may determine that the mode of the first application is the extended background running mode 1004, and wherein the resource allocation to the second application is smaller than the resource allocation to the first application, the electronic device 101 may determine that the mode of the first application is the extended foreground running mode 1003.

For example, the electronic device 101 may compare the resource allocation to the second application with a reference resource allocation, determining the mode of the first application. For example, when the resource allocation to the second application is smaller than the reference resource allocation, the electronic device 101 may determine that the mode of the first application is the extended foreground running mode 1003, or when the resource allocation to the second application is larger than the reference resource allocation, the electronic device 101 may determine that the mode of the first application is the extended background running mode.

According to an embodiment, the electronic device 101 may compare application-related information about the second application with the predetermined look-up table or predetermined reference information stored in the electronic device 101, determining the execution state-related mode of the first application. For example, when the application-related information about the second application corresponds to the extended foreground running mode, the electronic device 101 may run the first application based on the extended foreground running mode, or when the application-related information about the second application corresponds to the extended background running mode, the electronic device 101 may run the first application based on the extended background running mode.

In this case, the electronic device 101 may determine the execution state-related mode of the first application at various times. The various times may include at least one of the time when a request for running the second application is received and the time when the first application and the second application are running.

A switch between the first application and the second application is described in greater detail below.

Figure 26:
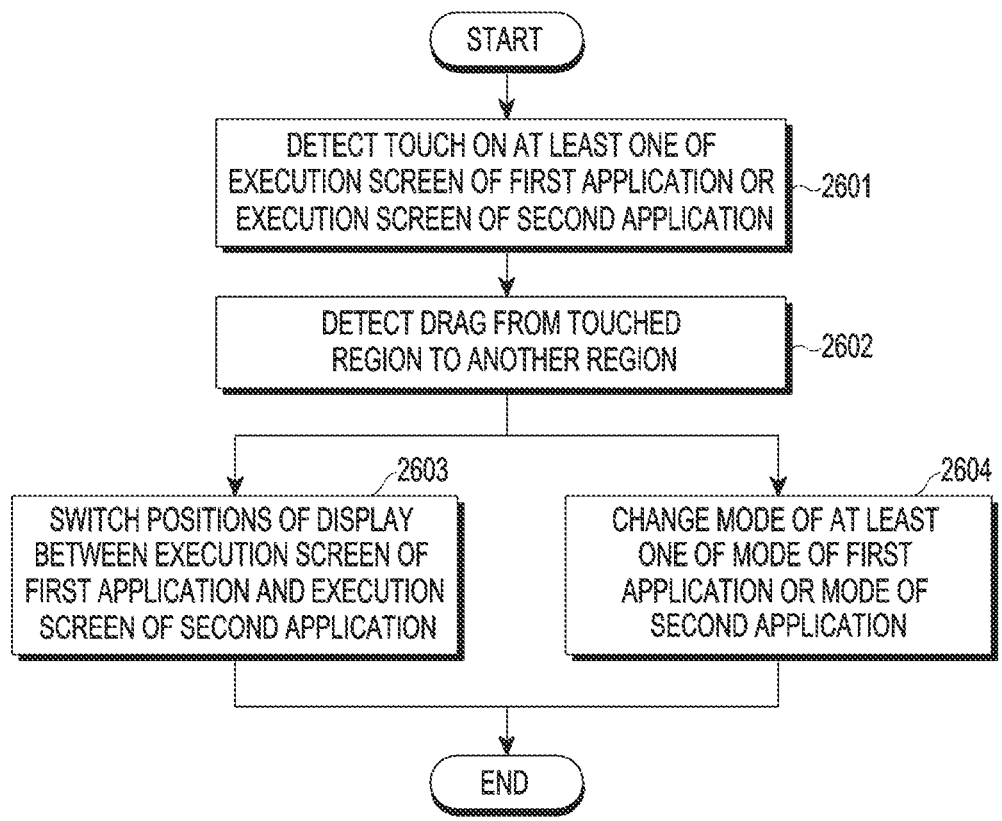
FIG. 26 is a flowchart illustrating an example switch between a first application and a second application according to an embodiment.

FIG. 26 is a flowchart illustrating an example of a switch between a first application and a second application according to an embodiment.

Figure 27:
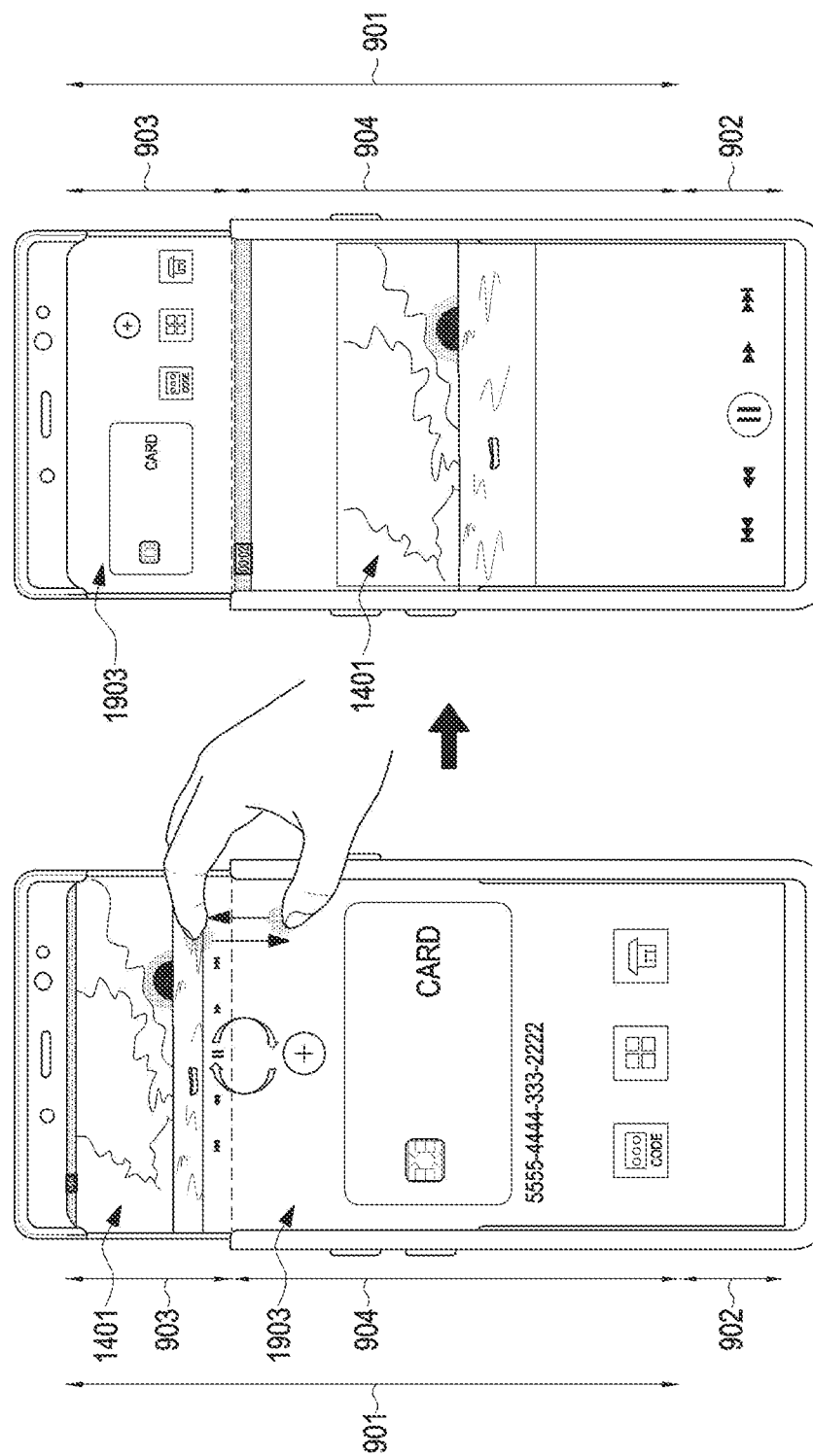
FIG. 27 is a diagram illustrating an example switch between a first application and a second application according to an embodiment.

FIG. 27 is a diagram illustrating an example of a switch between a first application and a second application according to an embodiment.

Referring to FIGS. 26 and 27, according to an embodiment, the electronic device 101 may switch at least one of the position or mode of the first application and the second application based on the user's touch.

Referring to FIG. 2.6, according to an embodiment, the electronic device 101 may detect a touch on at least one of the execution screen 1401 of the first application or the execution screen 1903 of the second application (2601). The electronic device 101 may detect a drag from the touched region to another region (2602). The electronic device 101 may switch the positions of display between the execution screen 1401 of the first application and the execution screen 1903 of the second application corresponding to detecting the drag (2603). The electronic device 101 may switch at least one of the mode of the first application or the mode of the second application (2604).

Operations 2603 and 2604 may be performed simultaneously or sequentially. When the operations are sequentially performed, operations 2603 and 2604 may be performed in various orders.

Operations 2601 to 2604 are described below in greater detail with reference to FIG. 27.

In operation 2601, according to an embodiment, the electronic device 101 may detect a touch on the portion 903 of the first region 901 where the execution screen 1401 of the first application is displayed or the other portion 904 of the first region 901 or second region 902 where the execution screen 1903 of the second application is displayed.

In operation 2602, according to an embodiment, upon detecting a touch on the portion 903 of the first region 901, the electronic device 101 may detect a drag from the region where the touch is detected to the second region 902. Upon detecting a touch on the other portion 904 of the first region 901 or second region 902, the electronic device 101 may detect a drag from the region where the touch is detected to the portion 903 of the first region 901. The drag may be referred to as a continuous touch in one direction. In operation 2602, detecting the drag may initiate at least one of operation 2603 or operation 2604.

In operation 2603, according to an embodiment, the electronic device 101 may display the execution screen 1401 of the first application on the other portion 904 of the first region 901 or the second region 902, corresponding to detecting the drag, as shown in FIG. 27. Corresponding to detecting the drag, the electronic device 101 may display the execution screen 1903 of the second application on the portion 903 of the first region 901. Although not shown in FIG. 26, according to an embodiment, the electronic device 101 may abstain from displaying at least one of the execution screen 1401 of the first application or the execution screen 1903 of the second application corresponding to detecting the drag before operation 2603. Without being limited thereto, the electronic device 101 may switch the display regions of the execution screens corresponding to detecting the drag while displaying the execution screen 1401 of the first application and the execution screen 1903 of the second application.

In operation 2604, according to an embodiment, the electronic device 101 may, switch the mode of the first application from the extended running mode to the foreground running mode 1001 and from the landscape mode to the portrait mode corresponding to detecting the drag. Thus, the resource allocation to the first application may decrease, and the horizontal length of the execution screen 1401 of the first application may decrease while the vertical length increases. Corresponding to detecting the drag, the electronic device 101 may switch the mode of the first application from the foreground running mode 1001 to the extended running mode and from the portrait mode to the landscape mode. Thus, the resource allocation to the first application may increase, and the horizontal length of the execution screen 1401 of the first application may increase while the vertical length decreases.

A mode switch of the first application displayed on the portion 903 of the first region 901 is described in greater detail below.

Figure 28:
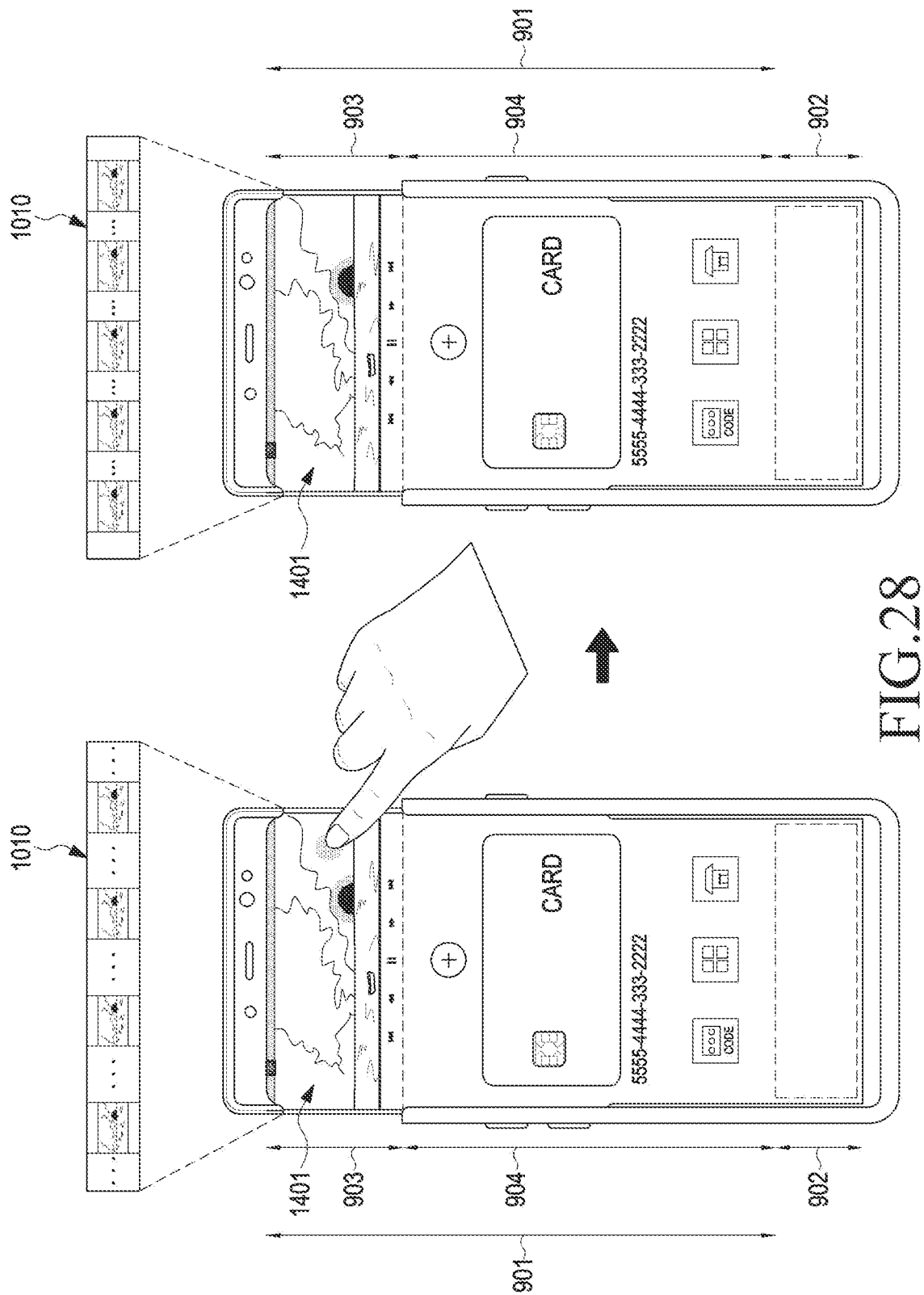
FIG. 28 is a diagram illustrating an example mode switch of a first application displayed on a portion of a first region according to an embodiment.

FIG. 28 is a diagram illustrating an example mode switch of a first application displayed on a portion 903 of a first region according to an embodiment.

Referring to FIG. 28, according to an embodiment, the electronic device 101 may switch the mode of the first application displayed on the portion 903 of the first region 901 based on whether a designated condition is met. For example, the designated condition may be detecting the user's touch on the execution screen 1401 of the first application or detecting a message related to the first application. For ease of description, an example is described in which the designated condition is the user's touch.

According to an embodiment, the electronic device 101 may detect a touch on the execution screen 1401 of the first application displayed on the portion 903 of the first region 901. Or, the electronic device 101 may detect a touch on the portion 903 of the first region 901.

According to an embodiment, the electronic device 101 may switch the execution state-related mode of the first application to a mode in which more resources are allocated to the first application, corresponding to the touch. For example, the electronic device 101 may switch the mode of the first application from the extended running mode to the foreground running mode 1001 corresponding to the touch, displaying the execution screen 1401 of the first application based on the foreground running mode 1001. Corresponding to the touch, the electronic device 101 may switch the mode of the first application from the extended background running mode 1004 to the extended foreground running mode 1003. Or, corresponding to the touch, the electronic device 101 may switch the mode of the first application from the extended foreground running mode 1003 to the foreground running mode 1001. In turn, the frame rate or refresh rate of the first application may increase or the update cycle may get shorter.

Although the execution screen 1401 of the first application is displayed on the portion 903 of the first region 901 upon detecting a pull-out of the display 312 in the above description, the execution screen 1401 of the first application may be displayed on the second region 902 upon detecting a pull-out of the display 312. In this case, the execution screen 1903 of the second application may be displayed on the first region 901. Upon detecting a pull-in of the display 312, a switch may be made between the regions where the execution screen 1401 of the first application is displayed to allow the execution screen 1401 of the first application, which used to be displayed on the second region 902, to be displayed on the first region 901.

Although described above to be performed corresponding to the display pull-in/our operation, the application execution screen display operation may not be performed corresponding to the display pull-in/out operation. For example, when the display 312 is pulled out, the execution screen 1401 of the first application may continue being displayed on the first region 901 or may be displayed on the other portion 904 of the first region 901 or the second region 902. As another example, when the display 312 is pulled out, the execution screen 1401 of the first application may be displayed on the first region 901 and the second region 902. In other words, after the display 312 is pulled out, the execution screen 1401 of the first application may be displayed on the full region of the display 312.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, a home appliance, or the like. According to an embodiment of the disclosure, the electronic device is not limited to the above-listed embodiments.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, an electronic device comprises a flexible display and at least one processor configured to control the display to display an execution screen 1401 of a first application on a first region exposed to the outside based in a first mode with the display bent, detect a pull-out of the display, and display, based on detection of the pull-out, the execution screen 1401 of the first application on at least a portion of the first region of the display based on a second mode with the display pulled out, and display an execution screen 1903 of a second application different from the first application on another portion of the first region and a second region of the display exposed to the outside by the pull-out.

According to an embodiment, the electronic device may comprise a first structure 310 including a first plate 311 where the display is disposed, a multi-bar structure connected to the first structure 310, and a roller rotated in a predetermined direction and configured to interwork with the multi-bar structure to pull out the display, wherein the second region may be hidden by the first structure 310, with the display bent, and may be exposed to the outside as the multi-bar structure moved as the roller rotates and the first structure 310 connected with the multi-bar structure slide in a direction.

According to an embodiment, the other portion of the first region and the second region may be substantially the same in shape as the first region, and the portion of the first region may be substantially the same in shape as the second region.

According to an embodiment, the first mode and the second mode may be display orientation-related modes. The processor may be configured to display the execution screen 1401 of the first application corresponding to a landscape mode on the first region of the display, with the display bent, as at least part of displaying the execution screen 1401 of the first application on the first region based on the first mode, display the execution screen 1401 of the first application corresponding to a portrait mode on at least the portion of the first region of the display, with the display pulled out, as at least part of displaying the execution screen 1401 of the first application on at least the portion of the first region of the display based on the second mode, and display the execution screen 1903 of the second application corresponding to the landscape mode on the other portion of the first region of the display and the second region, with the display unbent, as at least part of displaying the execution screen 1903 of the second application on the other portion of the first region of the display and the second region based on the first mode.

According to an embodiment, the first mode and the second mode may be execution state-related modes. The execution state-related modes may include a foreground running mode, an extended running mode, a paused ground running mode, and a background running mode.

According to an embodiment, the processor may be configured to run the first application based on the foreground running mode, with the display bent, as at least part of displaying the execution screen 1401 of the first application on the first region of the display based on the first mode, run the first application based on the extended running mode, with the display unbent, as at least part of displaying the execution screen 1401 of the first application on at least the portion of the first region of the display based on the second mode, and run the second application based on the foreground running mode, with the display unbent, as at least part of displaying the execution screen 1903 of the second application on the oilier portion of the first region of the display and the second region based on the first mode.

According to an embodiment, at least one of a frame rate or a refresh rate of the execution screen 1401 of the first application run based on the extended running mode may be lower than a frame rate or a refresh rate of the execution screen 1903 of the second application run based on the foreground running mode.

According to an embodiment, an update cycle of the first application run based on the extended running mode may be longer than an update cycle of the second application run based on the foreground running mode.

According to an embodiment, the processor may be configured to determine the second application highly associated with the first application and display an application panel including a second execution key to run the second application on at least one of the other portion of the first region or the second region, as at least part of displaying the execution screen 1903 of the second application on the other portion of the first region of the display and the second region based on the first mode.

According to an embodiment, the processor may be configured to display the execution screen 1903 of the second application based on a message related to the second application, as at least part of displaying the execution screen 1903 of the second application on the other portion of the first region of the display and the second region based on the first mode.

According to an embodiment, the processor may be configured to detect a touch on the portion of the first region and switch the first mode of the first application to another execution state-related mode to increase resource allocation to the first application, corresponding to the touch.

According to an embodiment, the processor may be configured to detect a touch on at least one of the portion of the first region or the other portion of the first region, detect a drag from where the touch is detected, and in response to the drag, display the execution screen of the first application on the other portion of the first region and the second region based on the first mode and display the execution screen of the second application on the portion of the first region based on the second mode.

According to an embodiment, the processor may be configured to detect a pull-in of the display and, corresponding to the pull-in of the display, display the execution screen of the first application on the first region based on the first mode.

According to an embodiment, a method for operating an electronic device including a display which is flexible comprises displaying an execution screen of a first application on a first region based on a first mode, detecting a pull-out of the display and displaying, based on detecting pull-out of the display, the execution screen of the first application on at least a portion of the first region of the display based on a second mode, with the display pulled out, and display an execution screen of a second application different from the first application on another portion of the first region and a second region of the display exposed by the pull-out.

According to an embodiment, the second region may be hidden by a first structure including a first plate where the display is disposed, with the display bent, and may be exposed as a multi-bar structure moved as a roller rotates and the first structure connected with the multi-bar structure slide in a direction. The other portion of the first region may be positioned between the portion of the first region and the second region.

According to an embodiment, the other portion of the first region and the second region may be substantially the same in shape as the first region, and the portion of the first region may be substantially the same in shape as the second region.

According to an embodiment, the first mode and the second mode may be display orientation-related modes. The method may further comprise displaying the execution screen of the first application corresponding to a landscape mode on the first region of the display, with the display bent, as at least part of displaying the execution screen of the first application on the first region based on the first mode, displaying the execution screen of the first application corresponding to a portrait mode on at least the portion of the first region of the display, with the display unbent, as at least part of displaying the execution screen of the first application on at least the portion of the first region of the display based on the second mode, and displaying the execution screen of the second application corresponding to the landscape mode on the other portion of the first region of the display and the second region, with the display unbent, as at least part of displaying the execution screen of the second application on the other portion of the first region of the display and the second region based on the first mode.

According to an embodiment, the first mode and the second mode may be execution state-related modes. The execution state-related modes may include a foreground running mode, an extended running mode; a paused ground running mode, and a background running mode.

According to an embodiment, the method may further comprise running the first application based on the foreground running mode, with the display bent, as at least part of displaying the execution screen of the first application on the first region of the display based on the first mode, running the first application based on the extended running mode, with the display unbent, as at least part of displaying the execution screen of the first application on at least the portion of the first region of the display based on the second mode, and running the second application based on the foreground running mode, with the display unbent, as at least part of displaying the execution screen of the second application on the other portion of the first region of the display and the second region based on the first mode.

According to an embodiment, there may be provided a storage medium storing instructions, the instructions configured to be executed by at least one circuit to enable the at least one circuit to perform at least one operation, the at least one operation comprising displaying an execution screen of a first application on a first region based on a first mode, with a display bent, detecting a pull-out of the display in a direction, and corresponding to detecting the pull-out, displaying the execution screen of the first application on at least a portion of the first region of the display based on a second mode, with the display unbent by the pull-out, and display an execution screen of a second application different from the first application on another portion of the first region and a second region of the display exposed by the pull-out.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to the embodiments, there may be provided an electronic device capable of controlling the display region of the execution screens of a particular application displayed on the display of the electronic device and an application newly executed, and a method for operating the same, based on whether the display is pulled in or out. According to the embodiments, the electronic device may shrink and display the execution screen of a particular application on the display while running another application on the remaining display region, allowing the user to use a plurality of applications in a quick and continuous manner.

While the disclosure has been illustrated and described with reference to certain example embodiments thereof, it will be understood by those skilled in the art that various changes in form and details may be made therein without departing from the spirit and scope of the disclosure as defined, for example, by the appended claims and their equivalents.

What is claimed is:

1. An electronic device, comprising:
a first structure;
a second structure;
a flexible display disposed on the first structure;
wherein the first structure is movably coupled with the second structure, and
wherein the flexible display and the structures are configured so that in a closed state a second region of the flexible display is covered by the second structure, and in an open state, where the first structure is moved in a first direction with respect the second structure, the second region of the flexible display is exposed from the second structure; and
at least one processor configured to:
control the flexible display to display an execution screen of a first application on a first region of the flexible display exposed to an outside based on a first mode when the electronic device is in the closed state,
detect that the electronic device is in the open state, and
based on detecting that the electronic device is in the open state, control the flexible display to display the execution screen of the first application on a portion of the first region based on a second mode and to display an execution screen of a second application different from the first application on a remaining portion of the first region and the second region of the flexible display being exposed from the second structure.

2. The electronic device of claim 1, wherein:
the first structure comprises a first plate where the flexible display is disposed;
a multi-bar structure connected to the first structure; and
a roller rotatable in a predetermined direction and configured to interwork with the multi-bar structure,
wherein the second region is hidden by the first structure based on the closed state of the electronic device, and
wherein the second region is exposed to the outside as the multi-bar structure moved, the roller is configured to rotate, and the first structure connected with the multi-bar structure is configured to slide along the second structure, based on the open state of the electronic device.

3. The electronic device of claim 2, wherein the remaining portion of the first region and the second region have substantially the same shape as the first region, and the portion of the first region has substantially the same shape as the second region.

4. The electronic device of claim 3, wherein the remaining portion of the first region is positioned between the portion of the first region and the second region.

5. The electronic device of claim 4, wherein at least one of the first application or the second application is configured to be executed based on execution state-related modes, and wherein the execution state-related modes include at least one of: a foreground running mode, an extended running mode, a paused ground running mode, or a background running mode.

6. The electronic device of claim 5, wherein the at least one processor is configured to:
run the first application based on the foreground running mode when the second region of the flexible display is covered by the second structure, as at least part of controlling the flexible display to display the execution screen of the first application on the first region of the flexible display,
run the first application based on the extended running mode when the second region of the flexible display is exposed from the second structure, as at least part of controlling the flexible display to display the execution screen of the first application on the portion of the first region, and
run the second application based on the foreground running mode when the second region of the flexible display is exposed from the second structure, as at least part of controlling the flexible display to display the execution screen of the second application on the remaining portion of the first region and the second region.

7. The electronic device of claim 6, wherein an update cycle of the first application run based on the extended running mode is longer than an update cycle of the second application run based on the foreground running mode.

8. The electronic device of claim 6, wherein the at least one processor is configured to:
  determine whether the second application is highly associated with the first application and to control the flexible display to display an application panel including at least one object to run the second application on at least one of the remaining portion of the first region or the second region.

9. The electronic device of claim 6, wherein the at least one processor is configured to:
  receive an input on the remaining portion of the first region, and
  switch the extended running mode of the first application to another execution state-related mode in response to receiving the input to increase a resource allocation to the first application.

10. The electronic device of claim 6, wherein the at least one processor is configured to:
  control the flexible display to display the execution screen of the second application based on a message related to the second application.

11. The electronic device of claim 6, wherein the at least one processor is configured to:
  receive a touch input on at least one of the portion of the first region or the remaining portion of the first region,
  detect a drag from where the input is received, and
  control the flexible display to display the execution screen of the first application on the remaining portion of the first region and the second region based on the foreground running mode and to display the execution screen of the second application on the portion of the first region based on the extended running mode in response to detecting the drag.

12. The electronic device of claim 6, wherein the at least one processor is configured to:
  detect a pull-in of the flexible display, and
  control the flexible display to display the execution screen of the first application on the first region based on the foreground running mode.

13. A method for operating an electronic device, the method comprising:
  displaying an execution screen of a first application on a first region of a flexible display exposed to an outside based on a first mode when the electronic device is in a closed state;
  detecting that the electronic device is in an open state; and
  based on detecting that the electronic device is in the open state, displaying the execution screen of the first application on a portion of the first region based on a second mode and displaying an execution screen of a second application different from the first application on another portion of the first region and a second region of the flexible display being exposed to the outside.

14. The method of claim 13, further comprising:
  running the first application based on the foreground running mode when the second region of the flexible display is covered, as at least part of controlling the flexible display to display the execution screen of the first application on the first region of the flexible display,
  running the first application based on the extended running mode when the second region of the flexible display is exposed from the second structure, as at least part of controlling the flexible display to display the execution screen of the first application on the portion of the first region, and
  running the second application based on the foreground running mode when the second region of the flexible display is exposed to the outside, as at least part of controlling the flexible display to display the execution screen of the second application on the another portion of the first region and the second region.

15. The method of claim 14, further comprising:
  determining whether the second application is highly associated with the first application and controlling the flexible display to display an application panel including at least one object to run the second application on at least one of the remaining portion of the first region or the second region.

16. The method of claim 14, further comprising:
  receiving an input on the another portion of the first region, and
  switching the extended running mode of the first application to another execution state-related mode in response to receiving the input to increase a resource allocation to the first application.

17. The method of claim 14, further comprising:
  controlling the flexible display to display the execution screen of the second application based on a message related to the second application.

18. The method of claim 14, further comprising:
  receiving a touch input on at least one of the portion of the first region or the another portion of the first region,
  detecting a drag from where the input is received, and
  controlling the flexible display to display the execution screen of the first application on the another portion of the first region and the second region based on the foreground running mode and displaying the execution screen of the second application on the portion of the first region based on the extended running mode in response to detecting the drag.

19. The method of claim 14, further comprising:
  detecting a pull-in of the flexible display, and
  controlling the flexible display to display the execution screen of the first application on the first region based on the foreground running mode.

20. A non-transitory computer readable storage medium having instructions recorded thereon, the instructions configured to be executed by at least one circuit of an electronic device to enable the at least one circuit to perform at least one operation, the at least one operation comprising:
  displaying an execution screen of a first application on a first region of a flexible display exposed to an outside based on a first mode when the electronic device is in the closed state;
  detecting that the electronic device is in an open state; and
  based on detecting that the electronic device is in the open state, displaying the execution screen of the first application on a portion of the first region based on a second mode and displaying an execution screen of a second application different from the first application on a remaining portion of the first region and a second region of the flexible display being exposed to the outside.

* * * * *